(12) United States Patent
Kusakabe

(10) Patent No.: US 9,537,538 B2
(45) Date of Patent: Jan. 3, 2017

(54) COMMUNICATION APPARATUS, CONTROL METHOD THEREFOR, AND COMPUTER-READABLE STORAGE MEDIUM

(71) Applicant: CANON KABUSHIKI KAISHA, Tokyo (JP)

(72) Inventor: Taketoshi Kusakabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 14/312,168

(22) Filed: Jun. 23, 2014

(65) Prior Publication Data

US 2015/0004914 A1 Jan. 1, 2015

(30) Foreign Application Priority Data

Jun. 28, 2013 (JP) .................................. 2013-137482

(51) Int. Cl.
*H04B 5/00* (2006.01)
*H04B 7/00* (2006.01)

(52) U.S. Cl.
CPC .......... *H04B 5/0037* (2013.01); *H04B 5/0031* (2013.01); *H04B 5/0056* (2013.01)

(58) Field of Classification Search
CPC .... H04B 5/0031; H04B 5/0037; H04B 5/0056
USPC .................................... 455/41.1, 41.2, 41.3
See application file for complete search history.

(56) References Cited

U.S. PATENT DOCUMENTS

| | | | | |
|---|---|---|---|---|
| 2006/0128360 | A1* | 6/2006 | Hibino | H04L 63/104 455/411 |
| 2006/0184705 | A1 | 8/2006 | Nakajima | 710/303 |
| 2009/0058361 | A1* | 3/2009 | John | A61N 1/3785 320/128 |
| 2013/0217333 | A1* | 8/2013 | Sprigg | H04W 4/008 455/41.2 |

(Continued)

FOREIGN PATENT DOCUMENTS

JP 2006-229583 A 8/2006

OTHER PUBLICATIONS

U.S. Appl. No. 14/375,861, filed Jul. 31, 2014.

(Continued)

*Primary Examiner* — Ping Hsieh
*Assistant Examiner* — Xin Jia
(74) *Attorney, Agent, or Firm* — Fitzpatrick, Cella, Harper & Scinto

(57) ABSTRACT

A communication apparatus receives a use request to use a function of the communication apparatus from an external device via a communication unit. When the use request is received, the communication apparatus acquires a first identifier for identifying the external device as a request source which requests the use of the function. Based on the acquired first identifier and a second identifier for identifying an external device which requests power supply by a power transmission unit, the communication apparatus determines whether to cause the power transmission unit to transmit power to the external device. If it is determined to transmit power, the communication apparatus transmits, via the power transmission unit, power to the external device which requests power supply.

11 Claims, 23 Drawing Sheets

(56) References Cited

U.S. PATENT DOCUMENTS

| | | | | |
|---|---|---|---|---|
| 2014/0117921 A1* | 5/2014 | Suomela | ............. | H04B 5/0031 |
| | | | | 320/103 |
| 2014/0184148 A1* | 7/2014 | Van Der Lee | ....... | H04B 5/0031 |
| | | | | 320/108 |
| 2014/0315604 A1* | 10/2014 | Miyake | ................... | H02J 7/025 |
| | | | | 455/573 |

OTHER PUBLICATIONS www.wirelesspowerconsortium.com/jp; retrieved/accessed on Jun. 19, 2014.
www.wirelesspowerconsortium.com; retrieved/accessed on Jul. 9, 2014.

* cited by examiner

F I G. 4
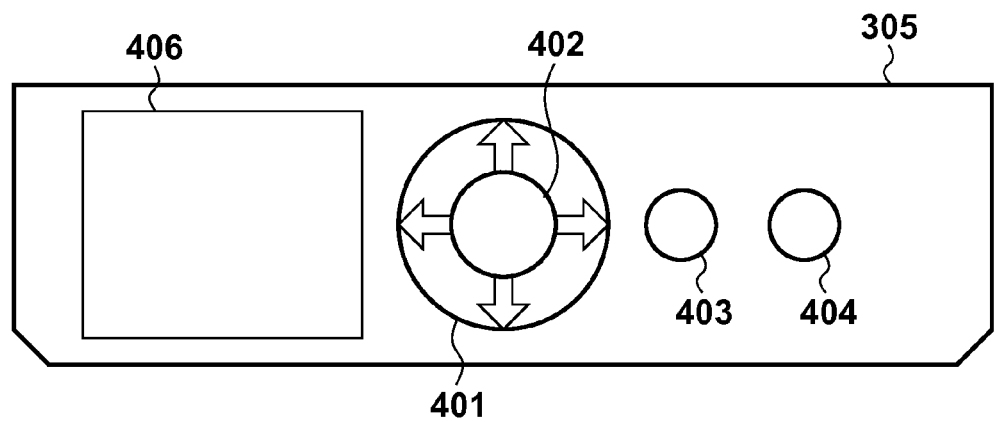
F I G. 5
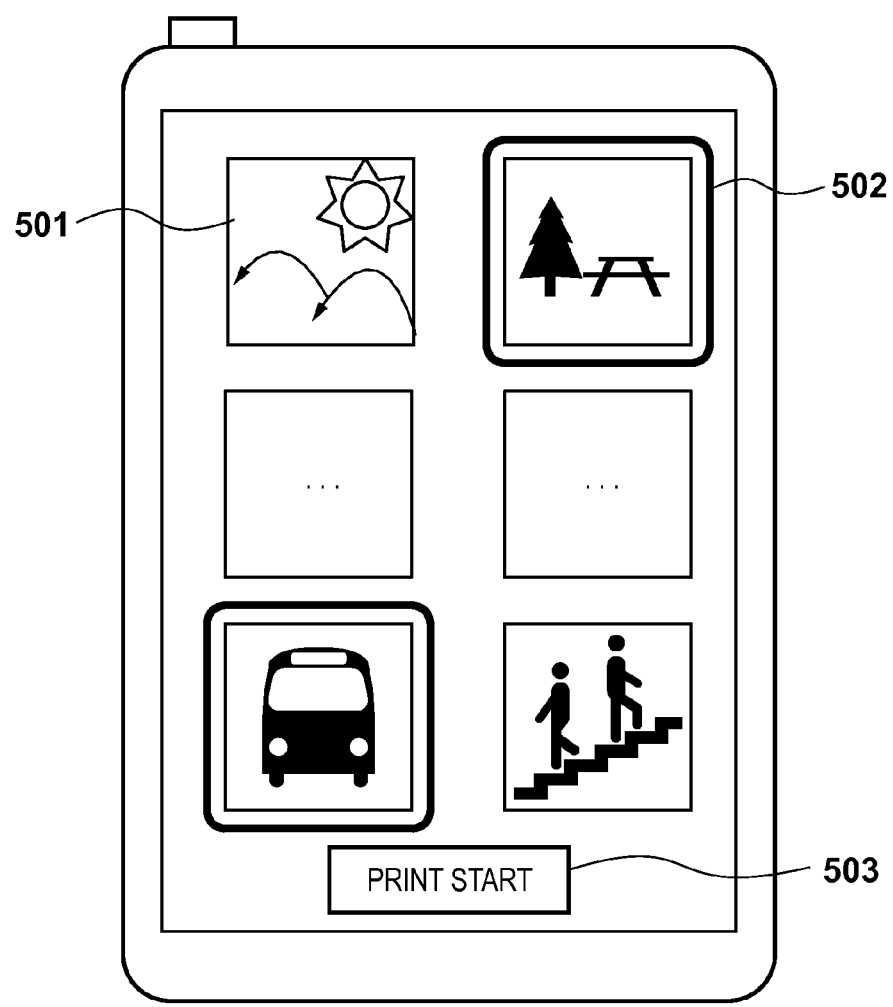

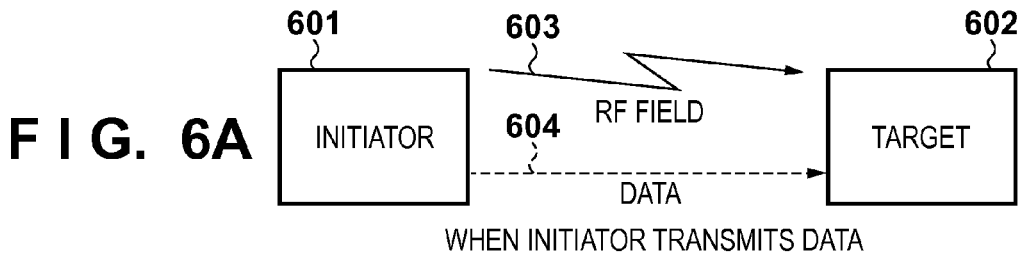
F I G. 6A  WHEN INITIATOR TRANSMITS DATA
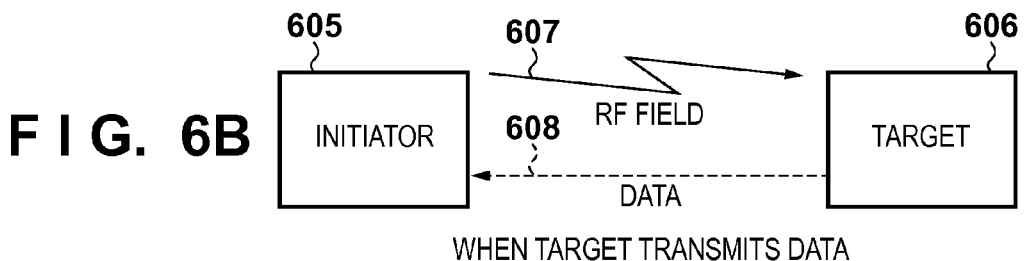
F I G. 6B  WHEN TARGET TRANSMITS DATA
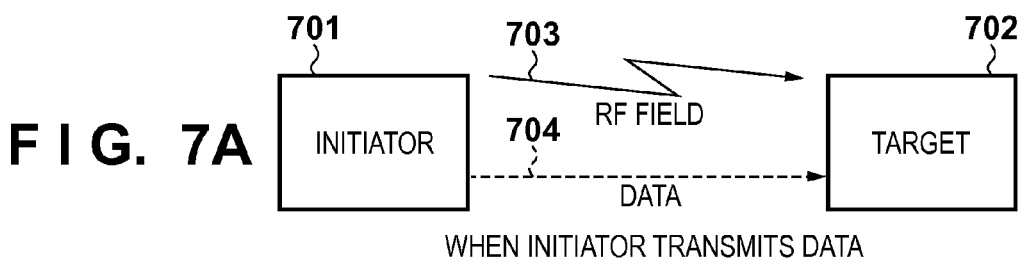
F I G. 7A  WHEN INITIATOR TRANSMITS DATA
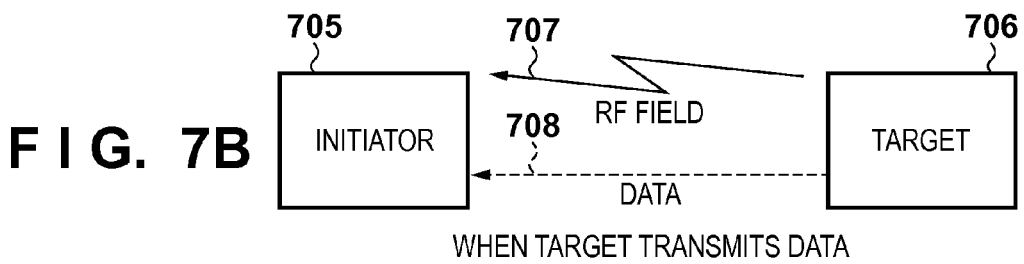
F I G. 7B  WHEN TARGET TRANSMITS DATA

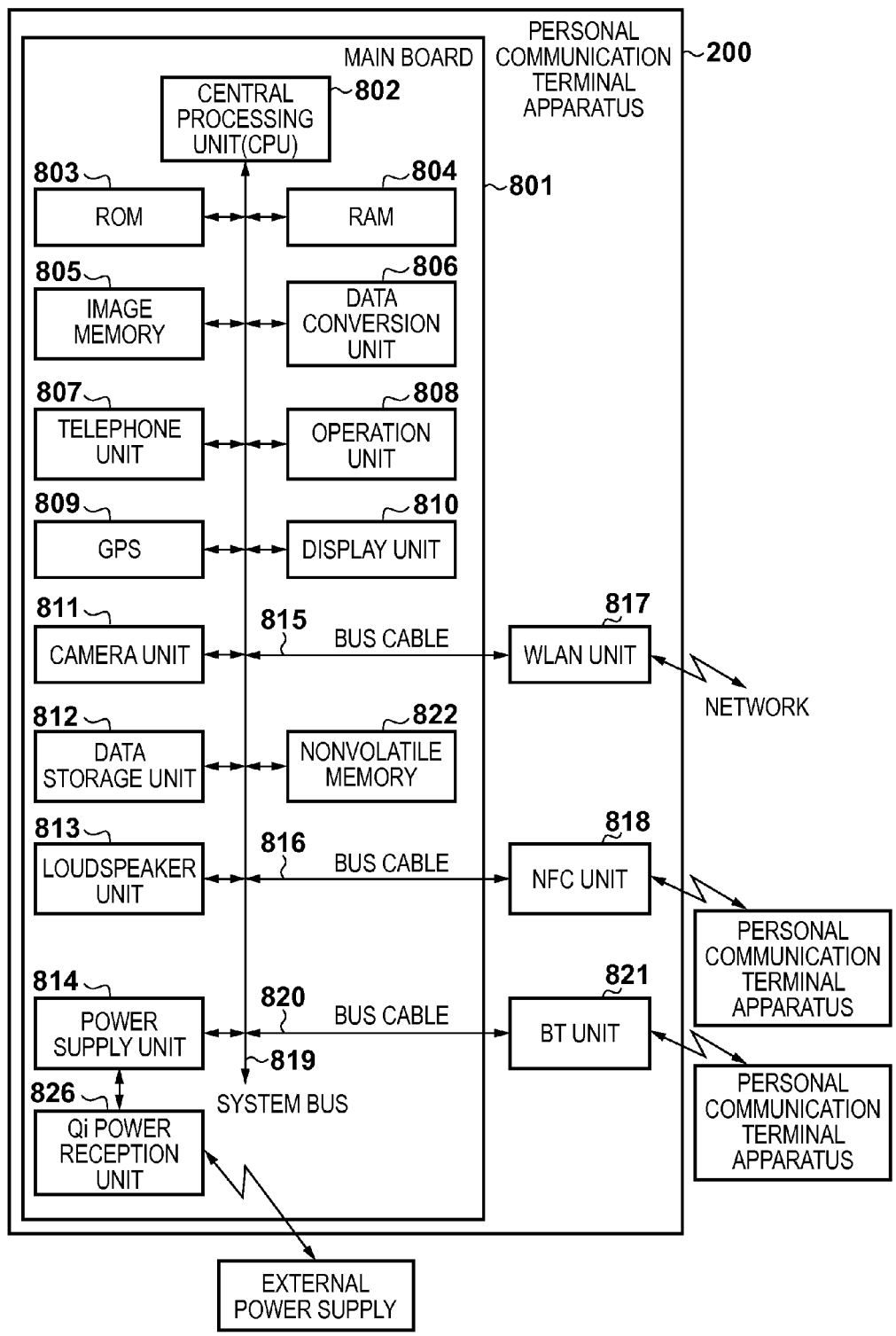

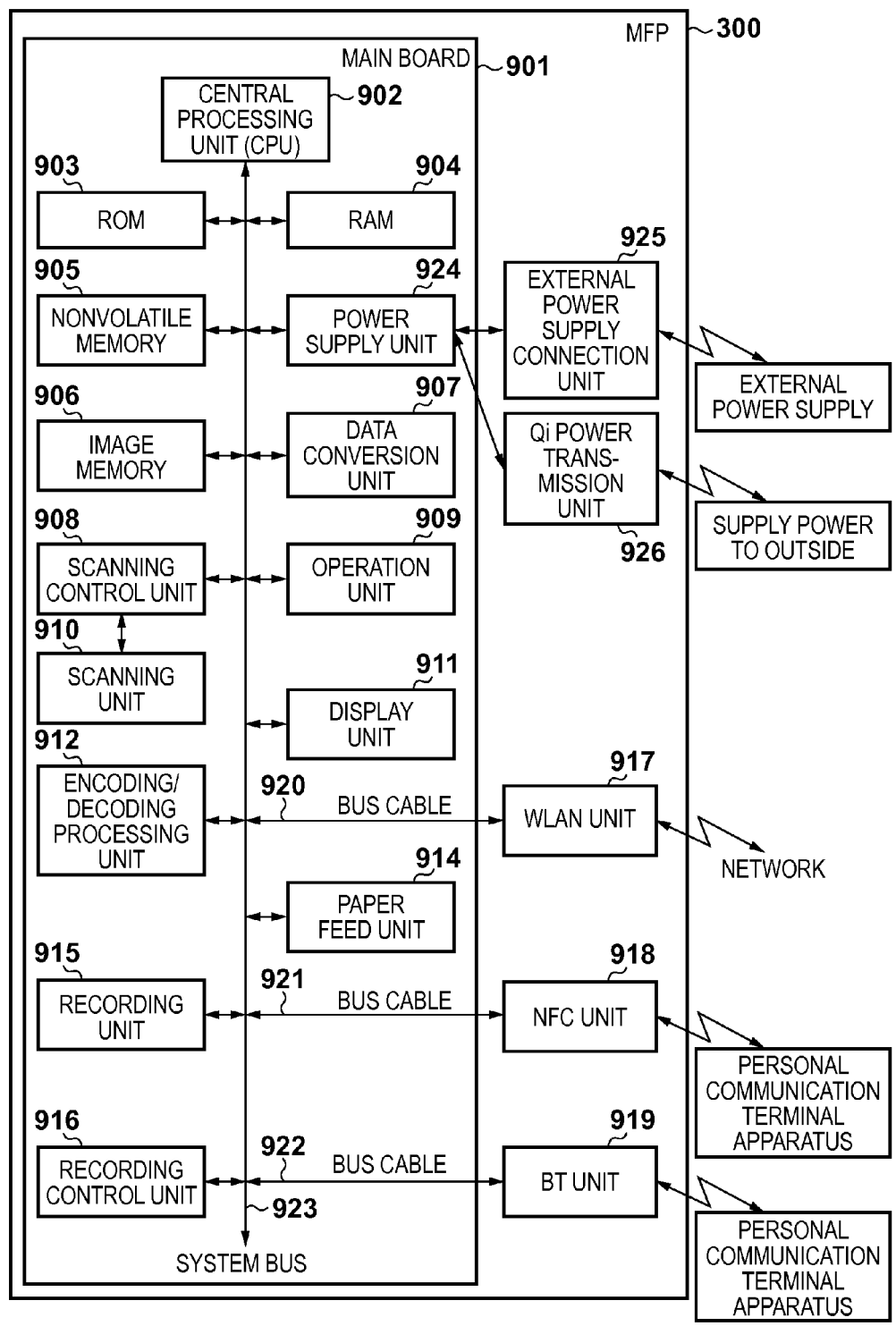

F I G. 18
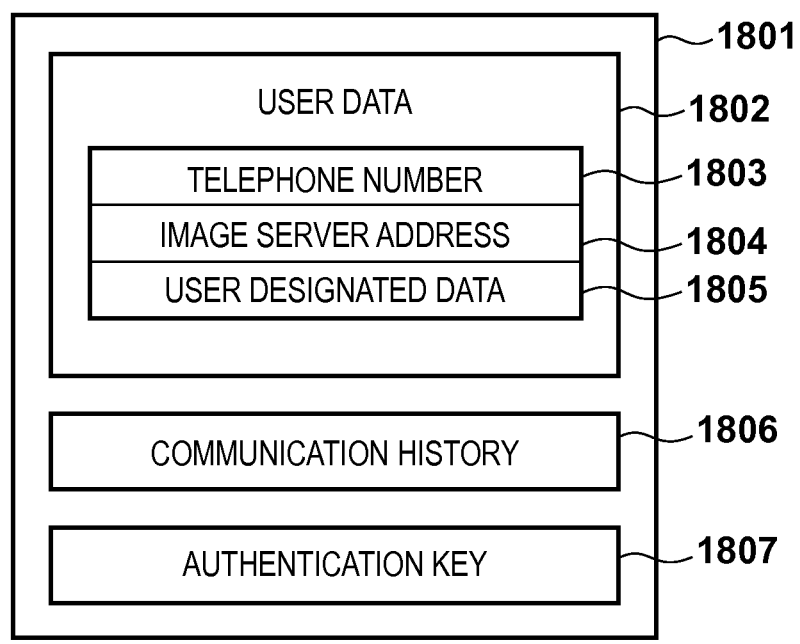

COMMUNICATION APPARATUS, CONTROL METHOD THEREFOR, AND COMPUTER-READABLE STORAGE MEDIUM

BACKGROUND OF THE INVENTION

Field of the Invention

The present invention relates to a communication technique of communicating with an external device.

Description of the Related Art

A personal communication terminal apparatus is known to perform short distance wireless communication in addition to communication via a communication network. A partner communication apparatus of short distance wireless communication is, for example, a personal communication terminal apparatus or an MFP (Multi Function Printer), which is known to transmit and receive image data and the like.

Since the personal communication terminal apparatus operates with power accumulated in a battery, it may be powered off during communication. This tendency is strong when, for example, the personal communication terminal apparatus transmits and receives a large amount of data to and from an MFP.

To implement efficient communication in consideration of the communication speed and power consumption, it is known to perform short distance wireless communication using two types of communication methods. This technique is called handover in which information necessary for the second short distance wireless communication method of a communication target apparatus is transmitted and received by the first short distance wireless communication method with low power consumption, thereby performing high-speed communication by the second short distance wireless communication method using the information. The first short distance wireless communication method is, for example, NFC (Near Field Communication), and the second short distance wireless communication method is, for example, Bluetooth® or wireless LAN.

In recent years, wireless power exchange is coming into practical use. In one example, the international standard Qi for wireless charging has been stipulated by Wireless Power Consortium (WPC) (http://www.wirelesspowerconsortium.com/jp).

As a technique of communicating print data from a terminal apparatus to a printing apparatus while wirelessly supplying power from the printing apparatus to the terminal apparatus, there is known a technique of specifying, as a communication partner, the printing apparatus serving as a power supply source, and wirelessly transmitting captured image data using the ID of the specified printing apparatus (see Japanese Patent Laid-Open No. 2006-229583).

In a method disclosed by Japanese Patent Laid-Open No. 2006-229583, however, power is supplied prior to printing, and thus the charging function of the printing apparatus is occupied by the terminal apparatus which is being charged. As a result, if a first terminal having a lower priority level (requiring only charging) with respect to the printing apparatus is connected to the printing apparatus, a second terminal having a higher priority level (requiring transmission of captured image data to a printer dock) cannot receive power. It is, therefore, impossible to avoid a risk that the battery of the second terminal runs out.

SUMMARY OF THE INVENTION

The present invention provides a communication technique capable of stably supplying power between an apparatus for providing a function and an apparatus for using the function, and ensuring completion of the use of the function between the apparatuses.

To achieve the above object, a communication apparatus according to the present invention has the following arrangement. That is, a communication apparatus for controlling a power transmission unit configured to transmit power to an external device, and a communication unit configured to communicate with the external device, comprising: a reception unit configured to receive a use request to use a function of the communication apparatus from the external device via the communication unit; an acquisition unit configured to acquire, when the reception unit receives the use request, a first identifier for identifying the external device as a request source which requests the use of the function; a determination unit configured to determine, based on the first identifier acquired by the acquisition unit and a second identifier for identifying an external device which requests power supply by the power transmission unit, whether to cause the power transmission unit to transmit power to the external device; and a power transmission control unit configured to transmit, via the power transmission unit, power to the external device which requests power supply, when the determination unit determines to transmit power.

According to the present invention, it is possible to provide a communication technique capable of stably supplying power between an apparatus for providing a function and an apparatus for using the function, and ensuring completion of the use of the function between the apparatuses.

Further features of the present invention will become apparent from the following description of exemplary embodiments with reference to the attached drawings.

BRIEF DESCRIPTION OF THE DRAWINGS

FIG. 4 is a plan view showing an operation and display unit;

FIG. 5 is a view showing a case in which thumbnails of print candidate files are displayed on the personal communication terminal apparatus;

FIG. 6A is a schematic view showing a passive mode in NFC communication;

FIG. 6B is a schematic view showing the passive mode in NFC communication;

FIG. 7A is a schematic view showing an active mode in NFC communication;

FIG. 7B is a schematic view showing the active mode in NFC communication;

FIG. 8 is a block diagram showing the arrangement of the personal communication terminal apparatus;

FIG. 9 is a block diagram showing the arrangement of the MFP;

FIG. 18 is a view showing the structure of an NFC memory of the personal communication terminal apparatus;

DESCRIPTION OF THE EMBODIMENTS

Embodiments of the present invention will be exemplarily described in detail below with reference to the accompanying drawings. Note that the relative arrangement of components, display screens, and the like set forth in the embodiments do not intend to limit the scope of the invention to them, unless otherwise specified.

In this embodiment, a case will be explained in which print data is transmitted using wireless charging and a short distance wireless communication method while avoiding a risk that the battery of a personal communication terminal apparatus as an external device runs out. More specifically, printing using a wireless LAN and short distance wireless communication such as NFC (Near Field Communication) while exchanging power according to the international standard Qi for wireless charging will be described.

Note that short distance wireless communication indicates wireless communication whose communication range is a relatively narrow predetermined range (for example, 1 m to several cm), which is represented by NFC.

<Basic Operation>

Figure 1:
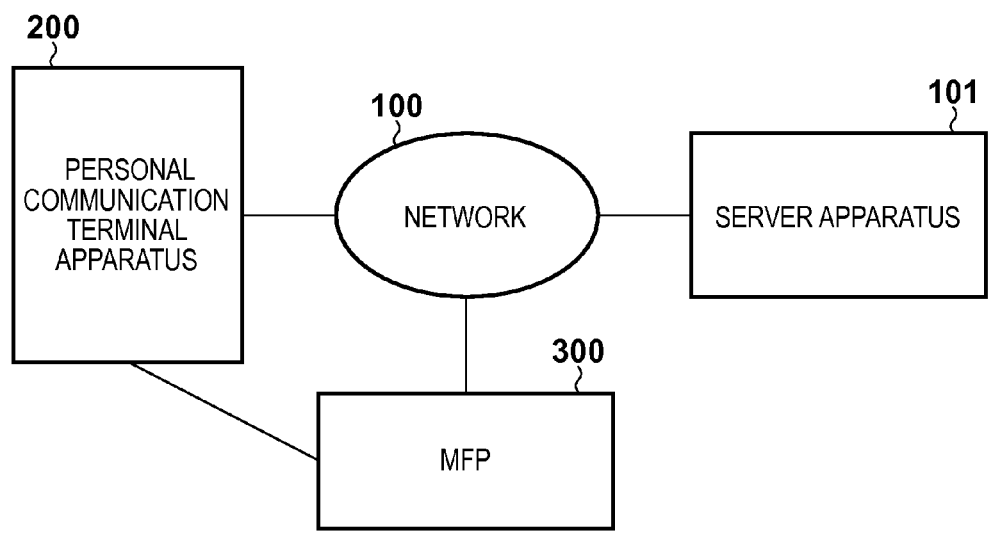
FIG. 1 is a view showing an example of the configuration of a wireless communication system.

FIG. 1 is a view showing the configuration of a wireless communication system.

A server apparatus 101, a personal communication terminal apparatus 200, and a multi function printer (to be referred to as an MFP hereinafter) 300 are connected to each other by using a network 100 as the center.

The server apparatus 101 provides various functions such as a function of storing image data for printing and a function of managing user IDs, and stores programs such as an image processing application.

The personal communication terminal apparatus 200 has at least two types of wireless communication functions whose authentication methods and communication speeds are different from each other. The personal communication terminal apparatus 200 may be any apparatus which can process a file to be printed, for example, a personal information terminal such as a PDA (Personal Digital Assistant), a mobile phone, or a digital camera.

The MFP 300 has a scanning function of scanning a document placed on a document table, and a printing function of performing printing using a print engine such as an inkjet printer, and may additionally have a FAX function and telephone function.

The network 100 and server apparatus 101 are connected via a wired LAN. The network 100 and MFP 300 are connected via a wired LAN or a wireless LAN (to be referred to as a WLAN hereinafter). The network 100 and personal communication terminal apparatus 200 are connected via a WLAN. Since both the personal communication terminal apparatus 200 and the MFP 300 have a WLAN function, they can perform peer-to-peer (to be referred to as P2P hereinafter) communication by executing mutual authentication.

Figure 2:
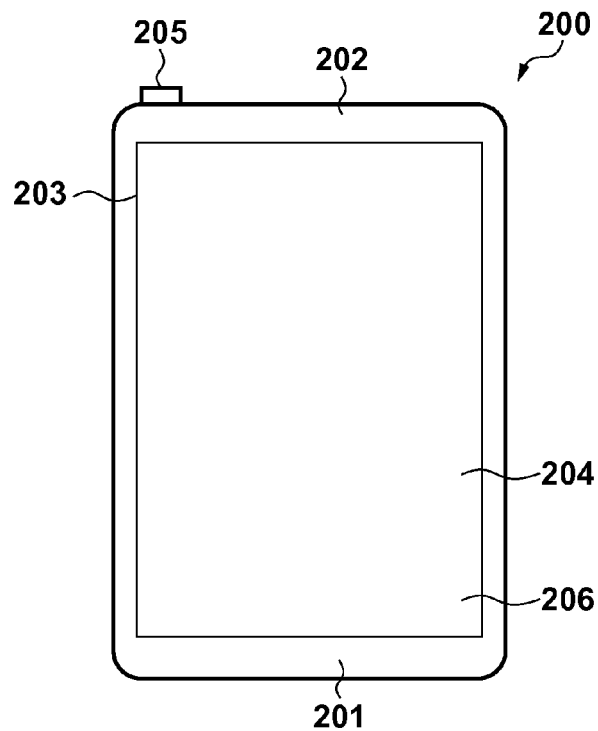
FIG. 2 is a view showing the outer appearance of a personal communication terminal apparatus.

FIG. 2 is a view showing the outer appearance of the personal communication terminal apparatus 200.

In this embodiment, a smartphone will be exemplified. The smartphone indicates a multi-function mobile phone which incorporates a camera, network browser, email function, and the like in addition to functions of a mobile phone. An NFC unit 201 is a unit for performing communication using NFC. When the NFC unit 201 is actually moved closer to a partner NFC unit within a predetermined distance (about 10 cm), they can communicate with each other.

A WLAN unit 202 is a unit used to perform communication via a WLAN, and is arranged within the personal communication terminal apparatus 200. A display unit 203 is, for example, a display having an LCD display mechanism. An operation unit 204 includes a touch-panel operation mechanism, and detects pressing information of the user. As a representative operation method, the display unit 203 displays button icons and a software keyboard, and the user presses the operation unit 204, thus issuing a button pressing event. A power key 205 is used to turn on/off the power. A Qi power reception unit 206 is a unit used to perform charging according to the international standard Qi for wireless charging stipulated by Wireless Power Consortium (WPC), and is arranged near the NFC unit 201 within the personal communication terminal apparatus 200. The Qi power reception unit 206 can perform charging by being moved closer to a Qi power transmission unit within a predetermined distance (for example, about 10 cm).

Figure 3A:
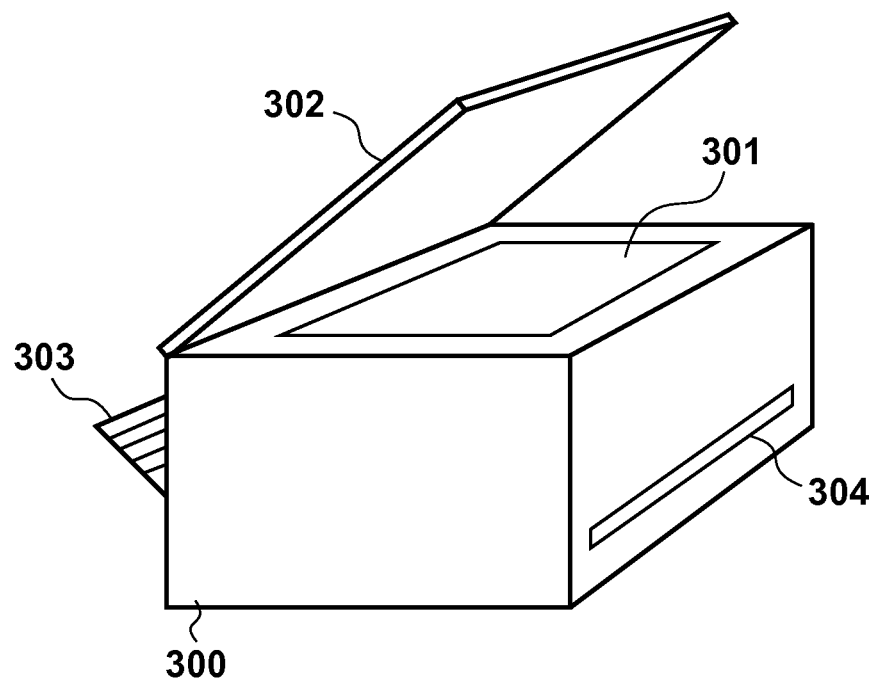
FIG. 3A is a view showing the outer appearance of an MFP.
Figure 3B:
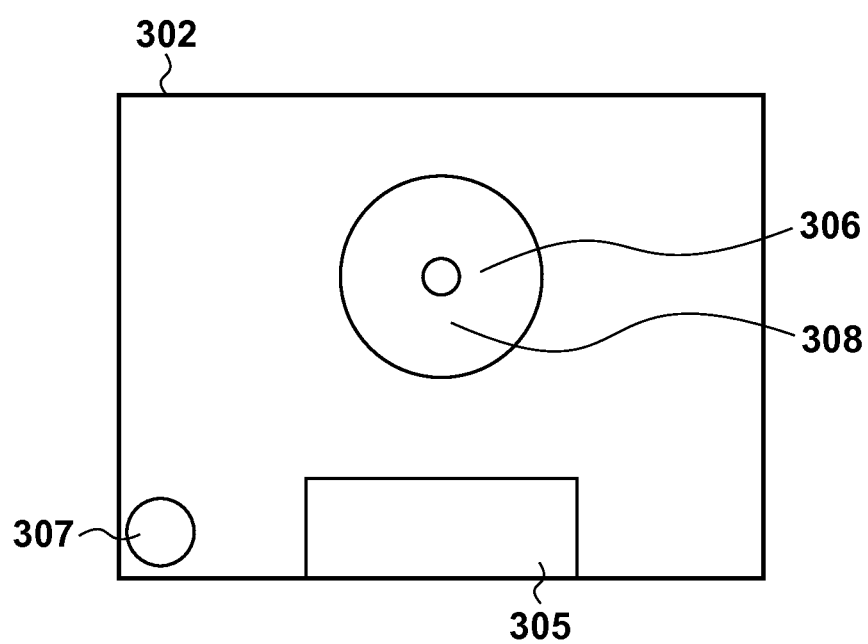
FIG. 3B is a view showing the upper portion of the MFP.

FIG. 3A is a view showing the outer appearance of the MFP. FIG. 3B is a view showing the upper portion of the MFP.

In this embodiment, an MFP (Multi Function Printer) having a scanning function (scanner) will be exemplified. Referring to FIG. 3A, a document table 301 is a glass-like transparent table which is used to scan a document placed on it by the scanner. A document cover 302 is a cover used to prevent scanning light from externally leaking at the time of scanning by the scanner. A printing paper insertion port 303 is an insertion port on which paper sheets of various sizes are set. Paper sheets set on the printing paper insertion port 303 are conveyed one by one to a printing unit, and are discharged from a printing paper discharge port 304 after desired printing is performed.

Referring to FIG. 3B, an operation and display unit 305 and an NFC unit 306 are arranged on the upper portion of the document cover 302. The operation and display unit 305 will be described in detail with reference to FIG. 4. The NFC unit 306 is a unit used to perform short distance wireless communication, and is a place where the personal communication terminal apparatus 200 is actually moved closer to the MFP 300 to contact it. A predetermined distance (about 10 cm) from the NFC unit 306 is an effective distance of contact. A WLAN antenna 307 is an antenna which is used to perform WLAN communication, and is embedded in the MFP. A Qi power transmission unit 308 is a unit used to supply power according to the international standard Qi, and is arranged near the NFC unit 306.

FIG. 4 is a plan view showing the operation and display unit 305.

A display unit 406 is a display screen used to display images and a user interface such as an operation menu, and includes, for example, a dot matrix LCD. A 4-way selector 401 is used for operations such as cursor movements on the display unit 406. A set key 402 is a key used to input settings. A function key 403 is used for an operation such as a function setting operation. A start key 404 is used to issue a function execution instruction such as a print/record start instruction.

FIG. 5 is a view showing a case in which thumbnails of print candidate files are displayed on the personal communication terminal apparatus 200.

Thumbnails 501 are those of files saved in the personal communication terminal apparatus 200, or those of files saved in the server apparatus 101. When the user presses a thumbnail (image) to be printed, a focus 502 is displayed to indicate that the thumbnail has been selected as a print target. The user can select a plurality of images to be printed, and a plurality of focuses 502 may be displayed on the display unit 203. When thumbnails cannot be displayed within one screen, they may be scrolled. After selecting an image to be printed, the user presses a print start key 503 to transmit a print job.

The communication mode of the NFC unit includes a passive mode and active mode. In the passive mode, a target responds to an instruction of an initiator by performing load modulation for an RF field generated by the initiator. On the other hand, in the active mode, the target responds to an instruction of the initiator by an RF field generated by the target itself.

FIGS. 6A and 6B are schematic views showing the passive mode in NFC.

As shown in FIG. 6A, when an initiator 601 transmits data 604 to a target 602 in the passive mode, it generates an RF field 603. The initiator 601 transmits the data 604 to the target 602 by modulating the RF field 603 by itself.

As shown in FIG. 6B, when a target 606 transmits data 608 to an initiator 605 in the passive mode, the initiator 605 generates an RF field 607, similarly to FIG. 6A. The target 606 transmits the data 608 to the initiator 605 by performing load modulation for the RF field 607. In data transmission by load modulation, the RF field from the initiator 605 causes a current to flow through the coil of the NFC unit serving as the target 606. The target 606 can use the current as power for data transmission. Consequently, even if no power is supplied to the NFC unit serving as the target 606, the NFC unit can perform data transmission complying with the NFC standard.

FIGS. 7A and 7B are schematic views showing the active mode in NFC.

As shown in FIG. 7A, when an initiator 701 transmits data 704 to a target 702 in the active mode, it generates an RF field 703. The initiator 701 transmits the data 704 to the target 702 by modulating the RF field 703 by itself. Upon completion of data transmission, the initiator 701 stops outputting the RF field 703.

As shown in FIG. 7B, when a target 706 transmits data 708 to an initiator 705 in the active mode, it generates an RF field 707. The target 706 transmits the data 708 by the RF field 707 generated by itself. Upon completion of transmission, the target 706 stops outputting the RF field 707.

FIG. 8 is a block diagram showing the arrangement of the personal communication terminal apparatus 200.

The personal communication terminal apparatus 200 includes a main board 801 for executing main control of the apparatus, a WLAN unit 817 for performing WLAN communication, an NFC unit 818 for performing NFC communication, and a BT unit 821 for performing Bluetooth® communication.

In the main board 801, a CPU 802 is a system control unit, and controls the overall personal communication terminal apparatus 200. A ROM 803 stores control programs to be executed by the CPU 802, an embedded operating system (OS) program, and the like. In this embodiment, the respective control programs stored in the ROM 803 execute software control such as scheduling and task switching under the management of the embedded OS stored in the ROM 803.

A RAM 804 is implemented by an SRAM (Static RAM) or the like, stores data such as program control variables, also stores data such as setting values registered by the user and management data of the personal communication terminal apparatus 200, and is allocated with various work buffer areas.

An image memory 805 is implemented by a memory such as a DRAM (Dynamic RAM), and temporarily stores image data received via a communication unit and those read out from a data storage unit 812 so as to be processed by the CPU 802. Note that the communication unit is a general term for communication functions including the WLAN unit 817, NFC unit 818, and BT unit 821.

A nonvolatile memory 822 is implemented by a memory such as a flash memory, and stores data to be saved even after power-off. Such data include, for example, an address book, mail history, incoming/outgoing call history, and information about devices connected in the past. Note that the memory structure is not limited to this. For example, the image memory 805 and the RAM 804 may share a memory, or data may be backed up in the data storage unit 812. In this embodiment, a DRAM is used as the image memory 805. However, the present invention is not limited to this since another storage medium such as a hard disk or a nonvolatile memory may be used.

A data conversion unit 806 executes analysis of a page description language (PDL) and the like, and data conversion such as color conversion and image conversion. A telephone unit 807 controls a telephone line, and implements telephone communication by processing audio data input/output via a loudspeaker unit 813. An operation unit 808 controls signals of the operation unit 204 (FIG. 2). A GPS (Global Positioning System) 809 acquires position information such as the current latitude and longitude. A display unit 810 electronically controls the display contents of the display unit 203 (FIG. 2), allows various input operations, and can display operation states, status conditions, and the like of the MFP 300.

A camera unit 811 has a function of electronically recording and encoding an image input via a lens. An image captured by the camera unit 811 is saved in the data storage unit 812. The loudspeaker unit 813 implements a function of inputting or outputting a speech for a telephone function, and also an alarm notification function and the like. A power supply unit 814 incorporates a Qi power reception unit 826 serving as a connection unit between a portable battery and an external power supply, which connects to the battery or external power supply and controls the connection. A power supply state includes a battery dead state in which the battery has no remaining amount, a power-off state in which the power key 205 is not pressed, an activation state in which the apparatus is normally active, and a power saving state in which the apparatus is active but is set in a power saving mode. The personal communication terminal apparatus 200 uses the Qi power reception unit 826 to implement wireless charging from the external power supply.

The personal communication terminal apparatus 200 incorporates three communication units used to perform wireless communication, and can perform wireless communication by WLAN, NFC, and Bluetooth®. Thus, the personal communication terminal apparatus 200 performs data communication with another device such as an MFP. Each communication unit converts data into packets, and transmits the packets to the other device. Conversely, each communication unit converts packets coming from another external device into data, and transmits the data to the CPU 802. The WLAN unit 817, NFC unit 818, and BT unit 821 are connected to the main board 801 via bus cables 815, 816, and 820, respectively. The WLAN unit 817, NFC unit 818, and BT unit 821 are units each used to attain communication complying with its standard. The NFC unit will be described in detail later with reference to FIG. 10.

The respective components 803 to 814, 817, 818, 821, and 822 of the main board 801 are connected to each other via a system bus 819 managed by the CPU 802.

FIG. 9 is a block diagram showing the schematic arrangement of the MFP 300.

The MFP 300 includes a main board 901 for executing main control of the apparatus itself, a WLAN unit 917 for performing WLAN communication, an NFC unit 918 for performing NFC communication, and a BT unit 919 for performing Bluetooth® communication.

In the main board 901, a CPU 902 is a system control unit, and controls the overall MFP 300. A ROM 903 stores control programs to be executed by the CPU 902, an embedded operating system (OS) program, and the like. In this embodiment, the respective control programs stored in the ROM 903 perform software control such as scheduling and task switching under the management of the embedded OS stored in the ROM 903.

A RAM 904 is implemented by an SRAM (Static RAM) or the like, stores data such as program control variables, also stores data such as setting values registered by the user and management data of the MFP 300, and is allocated with various work buffer areas.

A nonvolatile memory 905 is implemented by a memory such as a flash memory, and stores data to be held even after power-off. More specifically, such data include network connection information and user data. An image memory 906 is implemented by a DRAM (Dynamic RAM) or the like, and stores image data received via a communication unit, and those processed by an encoding/decoding processing unit 912. Also, the memory structure is not limited to this, similarly to the memory structure of the personal communication terminal apparatus 200. A data conversion unit 907 executes analysis of a page description language (PDL) and the like, conversion from image data into print data, and the like.

Note that the communication unit is a general term for communication functions including the WLAN unit 917, NFC unit 918, and BT unit 919.

A scanning control unit 908 controls a scanning unit 910 to optically scan a document by, for example, a CIS image sensor (contact type image sensor). Next, the scanning control unit 908 performs, via an image processing control unit (not shown), various kinds of image processing such as binarization processing and halftone processing for an image signal obtained by converting the scanned document into electrical image data, thereby outputting high-resolution image data.

An operation unit 909 and a display unit 911 correspond to the operation and display unit 305 (FIG. 4). The encoding/decoding processing unit 912 executes encoding/decoding processing and enlargement/reduction processing for image data (JPEG, PNG, or the like) handled by the MFP 300. A paper feed unit 914 holds paper sheets. A paper sheet can be fed from the paper feed unit 914 under the control of a recording control unit 916. Especially, as the paper feed unit 914, a plurality of paper feed units can be prepared so as to hold a plurality of types of paper sheets in one apparatus. Then, the recording control unit 916 can control to select a paper feed unit to be used to feed paper sheets.

The recording control unit 916 performs, via the image processing control unit (not shown), various kinds of image processing such as smoothing processing, recording density correction processing, and color correction for image data to be printed, and converts the image data into high-resolution image data, thereby outputting the obtained image data to a recording unit 915. The recording control unit 916 also serves to periodically read out information from the recording unit 915, and update information in the RAM 904. More specifically, the recording control unit 916 updates status information such as the remaining amount of an ink tank and a printhead state.

The MFP 300 also incorporates three communication units used to perform wireless communication, similarly to the personal communication terminal apparatus 200, and a description of these communication units will be omitted since their functions are the same. The WLAN unit 917, NFC unit 918, and BT unit 919 are connected to the main board 901 via bus cables 920, 921, and 922, respectively.

A power supply unit 924 is connected to an external power supply connection unit 925 and a Qi power transmission unit 926, and controls to receive power from the outside via the external power supply connection unit 925, and to supply power to an external Qi power reception unit via the Qi power transmission unit 926.

The respective components 902 to 919 and 924 of the main board 901 are connected to each other via a system bus 923 managed by the CPU 902.

Figure 10:
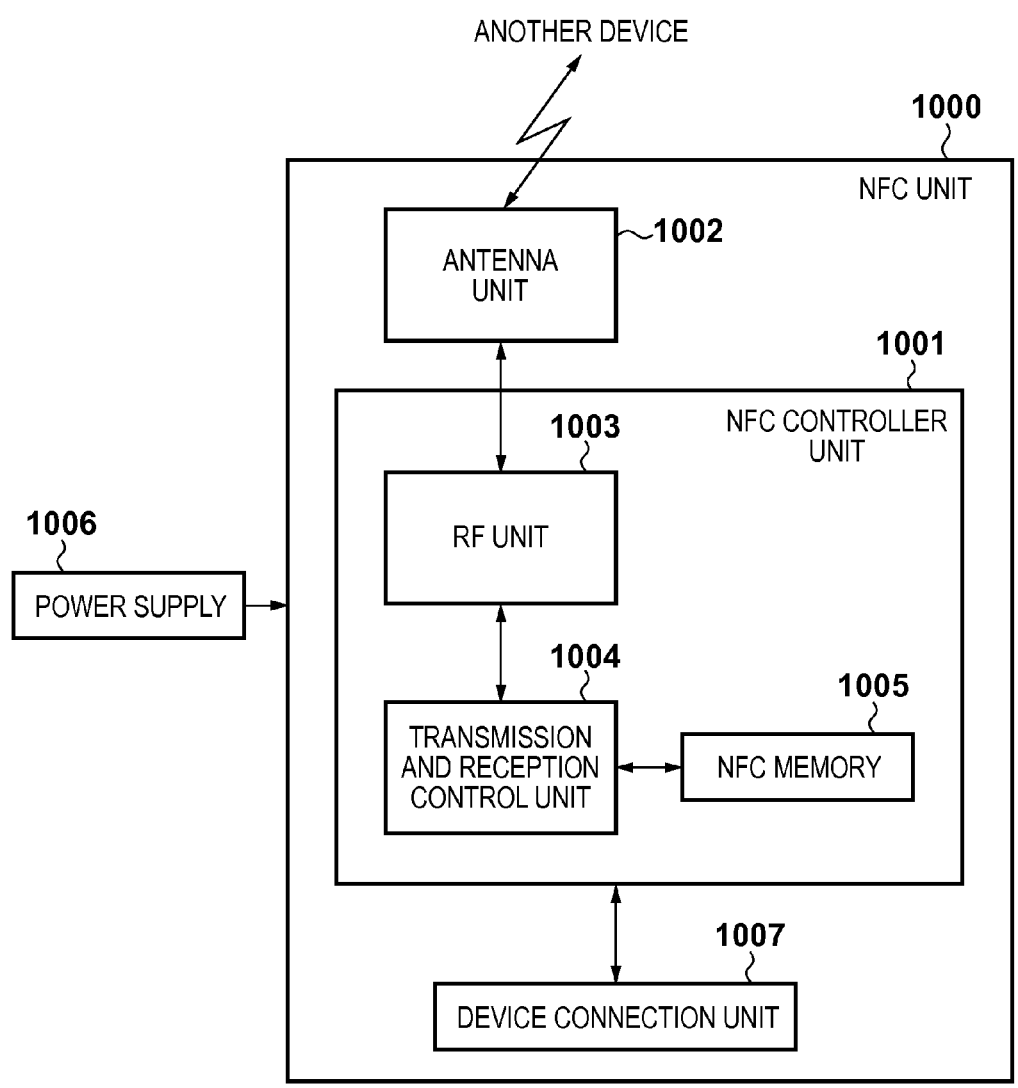
FIG. 10 is a block diagram showing the detailed arrangement of an NFC unit.

FIG. 10 is a block diagram showing details of an NFC unit used as the NFC unit 818 or 918.

The NFC unit 818 (FIG. 8) or NFC unit 918 (FIG. 9) will be described as an NFC unit 1000 with reference to FIG. 10. The NFC unit 1000 includes an NFC controller unit 1001, an antenna unit 1002, an RF unit 1003, a transmission and reception control unit 1004, an NFC memory 1005, a power supply 1006, and a device connection unit 1007.

The antenna unit 1002 receives radio waves and carriers from another NFC device (a device incorporating an NFC unit), and transmits radio waves and carriers to another NFC device. The RF unit 1003 has a function of modulating/demodulating an analog signal to a digital signal. The RF unit 1003 includes a synthesizer, and identifies frequency of bands and channels and controls the bands and channels based on frequency assignment data by identifying the frequencies of the bands and channels.

The transmission and reception control unit 1004 executes control associated with transmission/reception, such as assembling and disassembling of a transmission/reception frame, appending and detection of a preamble, and identification of a frame. The transmission and reception control unit 1004 also controls the NFC memory 1005 to read out/write various data and programs. When the NFC unit operates in the active mode in NFC communication, it receives power via the power supply 1006 to communicate with a device via the device connection unit 1007 and to communicate with another NFC device located within a communicable range by carriers transmitted/received via the antenna unit 1002. When the NFC unit operates in the passive mode in NFC communication, it receives carriers from another NFC device via the antenna unit 1002 to receive power from the other NFC device by electromagnetic induction, and transmits/receives data by performing communication with the other NFC device by modulating carriers.

Figure 11A:
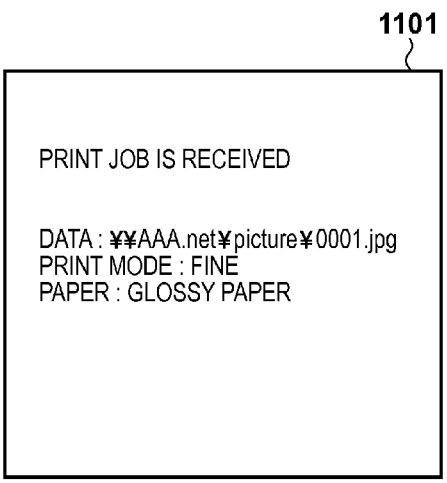
FIG. 11A is a view showing a display example on a display unit of the MFP.
Figure 11B:
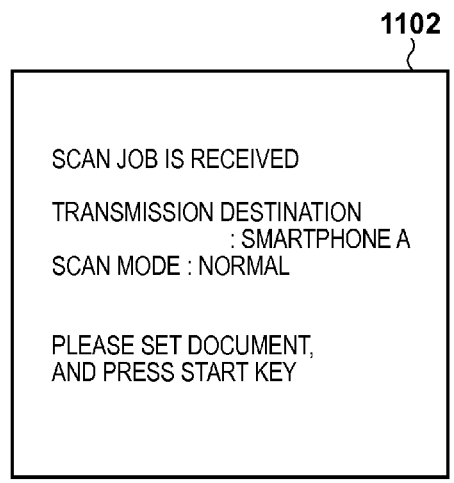
FIG. 11B is a view showing a display example on the display unit of the MFP.

FIGS. 11A and 11B are views each showing a display example on the display unit 406 of the MFP 300.

When a print job is received from the personal communication terminal apparatus 200, a print job confirmation screen 1101 is displayed on the display unit 406, as shown in FIG. 11A. When a scan job is received, a scan job confirmation screen 1102 is displayed, as shown in FIG. 11B.

Figure 12A:
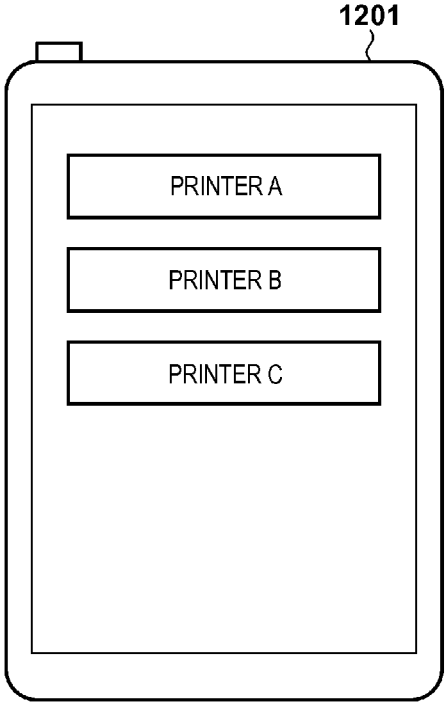
FIG. 12A is a view showing a display example on a display unit of the personal communication terminal apparatus.
Figure 12B:
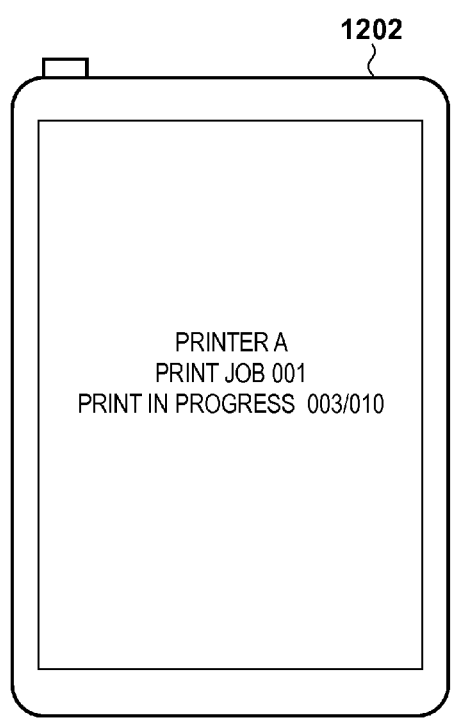
FIG. 12B is a view showing a display example on the display unit of the personal communication terminal apparatus.

FIGS. 12A and 12B are views each showing a display example on the display unit 203 of the personal communication terminal apparatus 200. A printer selection screen 1201 shown in FIG. 12A is an example of a screen for selecting a printer to be used for printing. A printing state display screen 1202 shown in FIG. 12B is an example of a screen for displaying, in real time, the current state of the printing apparatus which has submitted a print job.

Figure 13:
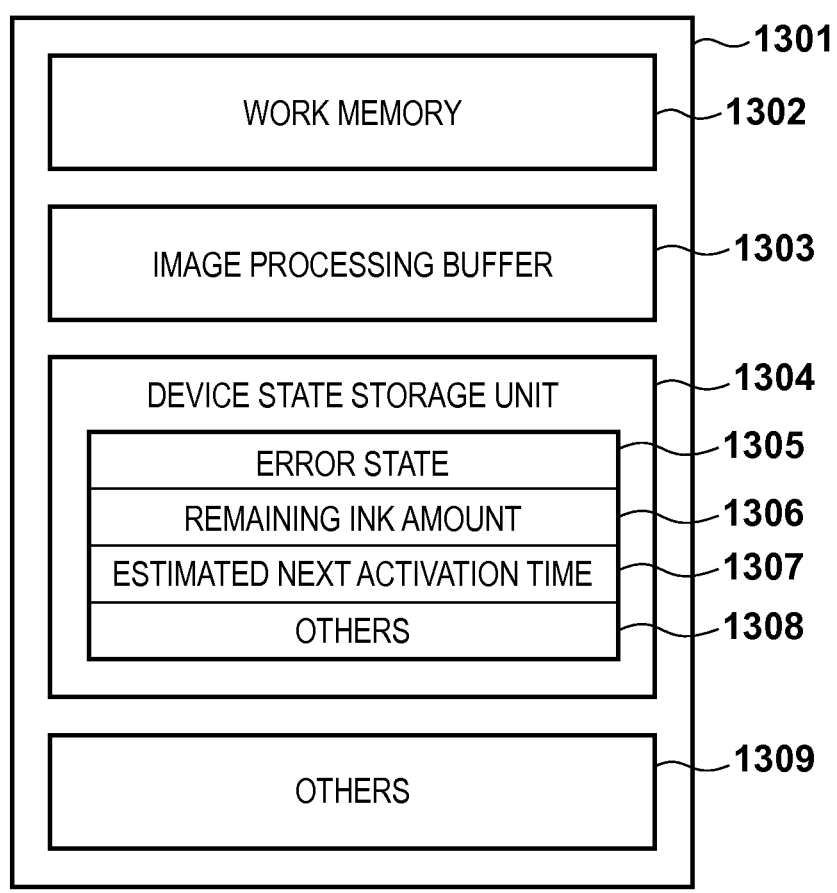
FIG. 13 is a view showing the structure of a RAM of the MFP.

FIG. 13 is a view showing the structure of the RAM 904 of the MFP 300.

Reference numeral 1301 denotes a storage area of the RAM 904. A work memory 1302 is an area allocated to execute a program. An image processing buffer 1303 is an area used as a temporary buffer for image processing. A device state storage unit 1304 stores various kinds of information about the current state of the MFP 300. In this example, the information includes an error state 1305, a remaining ink amount 1306, an estimated next activation time 1307, and others 1308.

The error state 1305 stores a state about an error of the MFP 300. Examples of the state about an error are a low-ink warning, an ink-out error, a paper jam error, a paper-out warning, an image printing failure warning, an image scanning failure error, and a network disconnection warning. The level of influence on the printing function, the level of influence on the scanning function, and the like are associated with these warnings and errors. For example, in case of the ink-out error, the printing function is unusable, but the scanning function is usable. In case of the network disconnection warning, any function using the network is unusable, but a setting change function or the scanning function, which is performed in the device alone, is usable.

The remaining ink amount 1306 stores the model number of the currently attached ink tank and the remaining ink amount. The model number of the ink tank is updated at the timing of attaching the ink tank. The remaining ink amount 1306 is updated every time the ink is used.

At the time of power-off, the estimated next activation time 1307 stores the estimated activation time when the MFP is activated next. The activation time of the MFP 300 largely changes depending on the state. The power supply state of the MFP 300 includes, for example, a hard-off state, a soft-off state, a normal activation state, and a sleep state. The hard-off state is a state in which the power supply stops. To cause the MFP to transit from the hard-off state to the normal activation state by powering on the MFP, a long time is required. The soft-off state is a state in which the power is partially supplied but the main program is not activated. In this case, the MFP can be activated in a shorter time than the hard-off state. In the sleep state, only parts which consume large power are off, and other programs and mechanisms are operating. Thus, the normal activation state can be restored relatively quickly. Another factor which causes a variation in activation time is an error state of the device. For example, upon detecting that many nozzles of an inkjet printhead clog, the MFP is activated after performing long-time recovery processing in the next activation. If the light amount of the scanner has dropped, the MFP is activated after performing an adjustment operation. In this way, based on the state transition of the power supply and the device state, the estimated activation time when the MFP is activated next is decided.

The others 1308 store other device states such as the current memory utilization, hardware temperature, and consumable information. Others 1309 store data other than the above-described various data.

Figure 14:
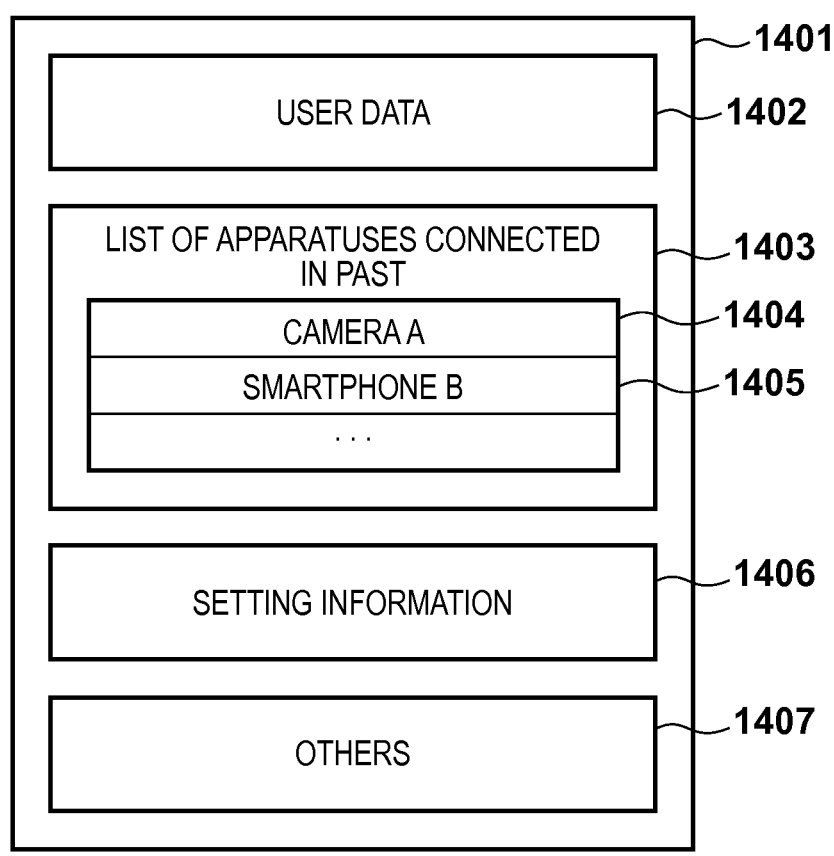
FIG. 14 is a view showing the structure of a nonvolatile memory of the MFP.

FIG. 14 is a view showing the structure of the nonvolatile memory 905 of the MFP 300.

Reference numeral 1401 denotes a storage area of the nonvolatile memory 905. User data 1402 stores information about the user, for example, a FAX number, communication history, network information, and the like. A list 1403 of apparatuses connected in the past stores a list of apparatuses connected to the MFP 300 so far. For example, if the MFP communicated with a smartphone by NFC, the identifier of the smartphone is stored. If P2P connection with a smartphone was done by WLAN, identification information for WLAN connection is stored. More specifically, if WPS (Wi-Fi Protected Setup) is used for WLAN connection, WPS Credential authentication information is stored. If the MFP was connected to a smartphone by Bluetooth®, OOB authentication information is stored. If the MFP 300 was connected to a server apparatus via a LAN, the network information of the server apparatus is stored.

Setting information 1406 stores the setting information of the MFP 300. The setting information 1406 includes, for example, menu items such as a print mode, and correction information of an inkjet printhead. Others 1407 store another nonvolatile information.

Figure 15:
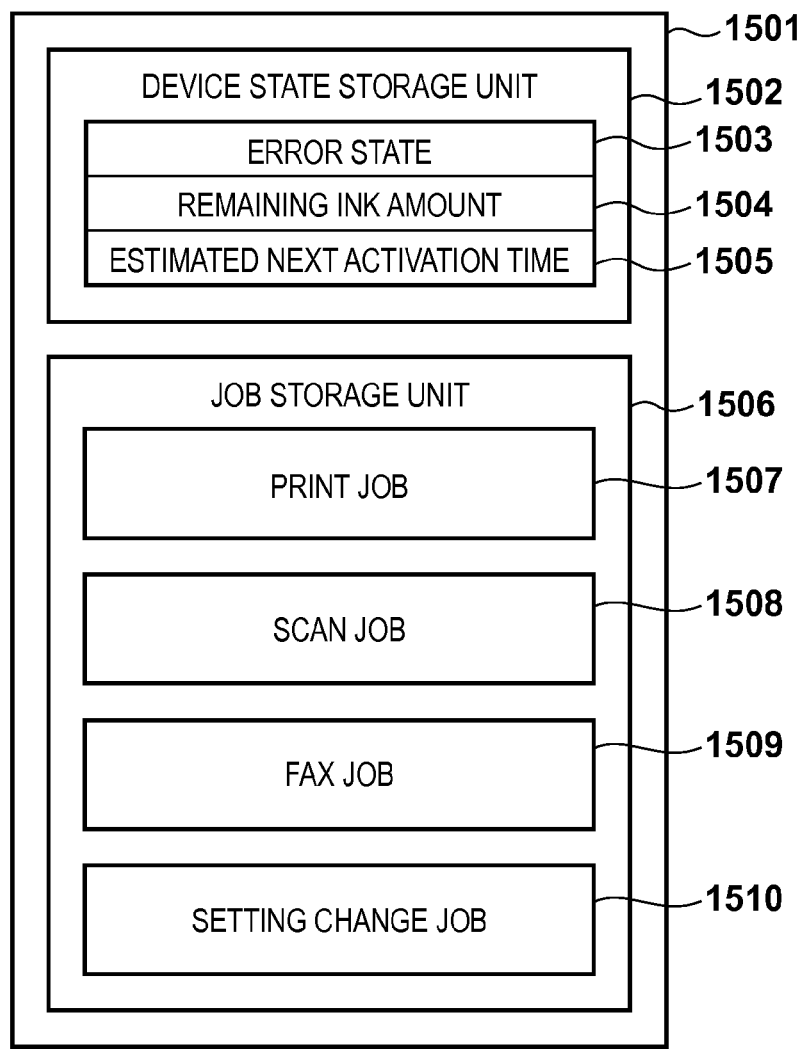
FIG. 15 is a view showing the structure of an NFC memory of the MFP.

FIG. 15 is a view showing the structure of the NFC memory 1005 of the MFP 300.

Reference numeral 1501 denotes a storage area of the NFC memory 1005 of the MFP 300. The contents of the device state storage unit 1304 (FIG. 13) are copied to a device state storage unit 1502 at a predetermined timing. An error state 1503, a remaining ink amount 1504, and an estimated next activation time 1505 correspond to the error state 1305, remaining ink amount 1306, and estimated next activation time 1307 of FIG. 13, respectively.

A job storage unit 1506 is an area used to submit a job from the personal communication terminal apparatus 200 to the MFP 300 by NFC. A print job 1507 stores print jobs in a queue. More specifically, print settings and an image link destination are stored. A scan job 1508 stores scan jobs in a queue. More specifically, scanning settings are stored. A FAX job 1509 stores FAX jobs in a queue. More specifically, FAX settings including the telephone number of a transmission destination and communication image quality are stored, and if an image has already been scanned, the link destination of the image is also stored. A setting change job 1510 stores setting change jobs in a queue. More specifically, jobs concerning changes in the setting items of the main body are stored.

Figure 16:
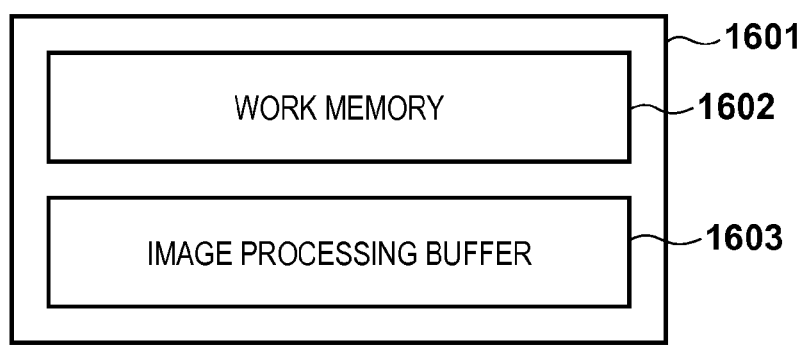
FIG. 16 is a view showing the structure of a RAM of the personal communication terminal apparatus.

FIG. 16 is a view showing the structure of the RAM 804 of the personal communication terminal apparatus 200.

Reference numeral 1601 denotes a storage area of the RAM 804. A work memory 1602 is a storage area allocated to execute a program. An image processing buffer 1603 is a buffer used to reduce an image to a thumbnail size or transmit an image to a printer by band processing.

Figure 17:
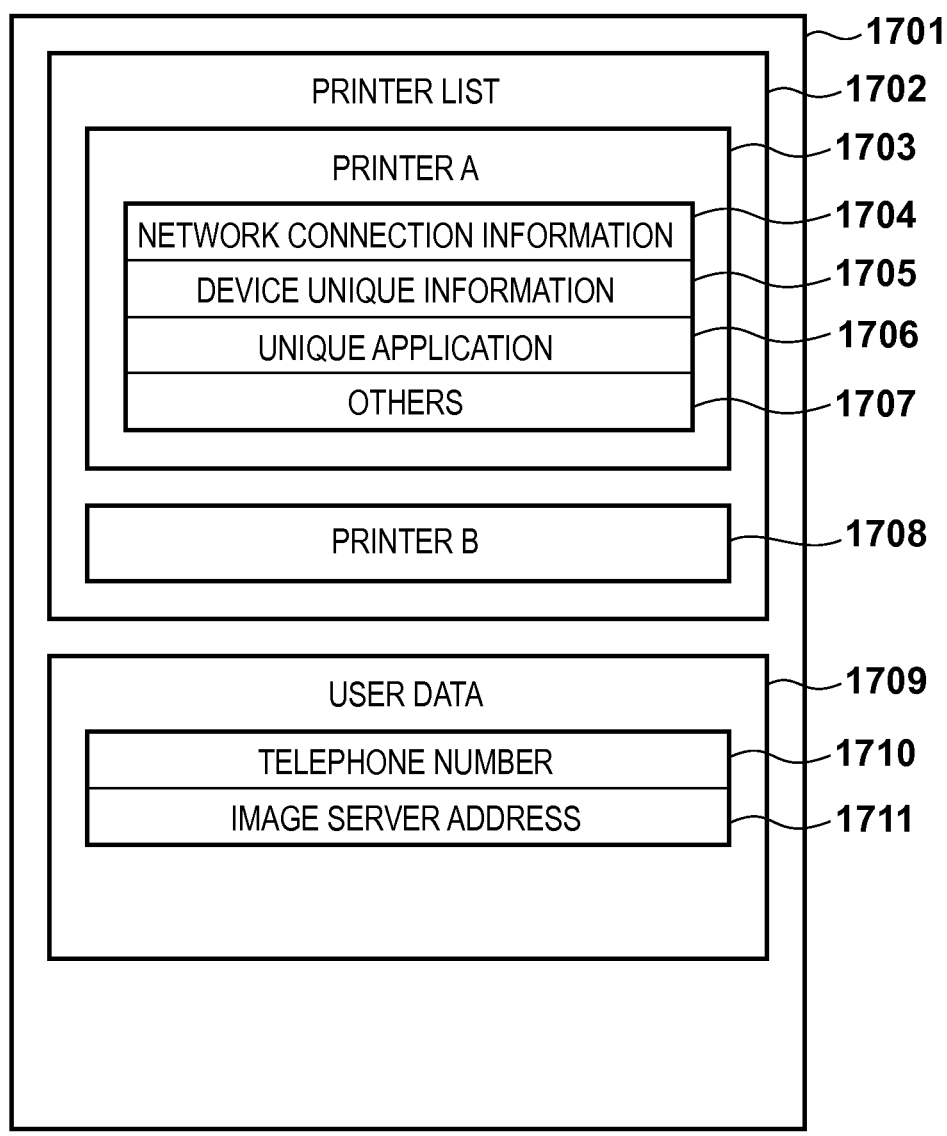
FIG. 17 is a view showing the structure of a nonvolatile memory of the personal communication terminal apparatus.

FIG. 17 is a view showing the structure of the nonvolatile memory 822 of the personal communication terminal apparatus 200.

Reference numeral 1701 denotes a storage area of the nonvolatile memory 822. A printer list 1702 stores a list of printers connected to the personal communication terminal apparatus 200 so far. A printer A 1703 is an example of the printer. Network connection information 1704 stores network connection information obtained when the printer A is connected to a network. For example, when the printer is connected via a LAN, the address of the connection destination and authentication information are stored. Device unique information 1705 stores information about the printer A. For example, information such as the resolution and the number of inks of the printer A is stored. A unique application 1706 is an application used to perform processing unique to the printer A, and is downloaded via a network or saved in the personal communication terminal apparatus 200 when it is connected to the printer A for the first time. The unique application 1706 converts an image into a format complying with the specifications of the printer A, controls band processing, or controls communication. A printer B 1708 is another example of the printer. User data 1709 stores data about the user such as a telephone number 1710 and an image server address 1711.

FIG. 18 is a view showing the structure of the NFC memory 1005 of the personal communication terminal apparatus 200.

Note that even after the battery of the personal communication terminal apparatus 200 is dead, data stored in the NFC memory 1005 can be read out/written by NFC communication in the passive mode.

Reference numeral 1801 denotes a storage area of the NFC memory 1005 of the personal communication terminal apparatus 200. User data 1802 stores a telephone number 1803, an image server address 1804, and the like. User designated data 1805 and the like can also be added in accordance with a user designation. In addition, the NFC memory stores an NFC communication history 1806. When communicating as a target in the passive mode, data in the NFC memory 1005 can be read out/written by executing authentication using an authentication key 1807 in accordance with a predetermined procedure even after the battery of the personal communication terminal apparatus 200 is dead.

Figure 19:
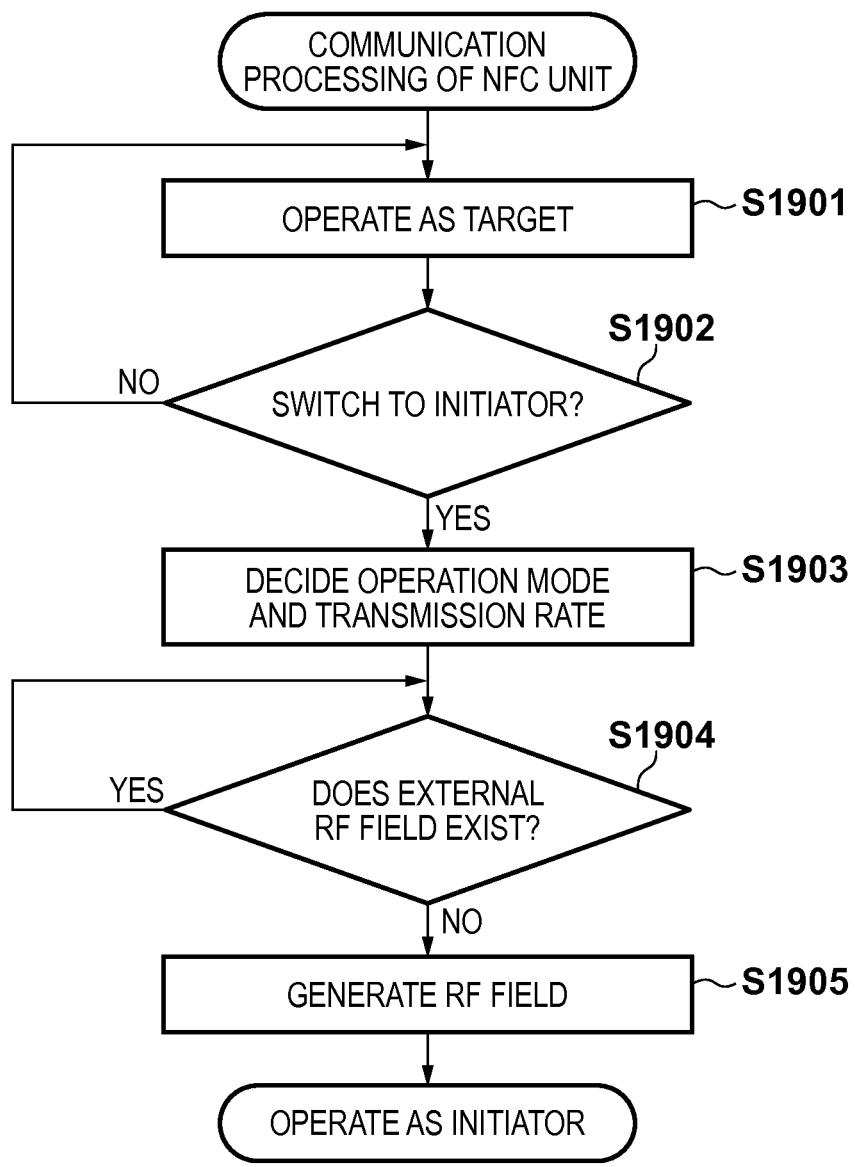
FIG. 19 is a flowchart illustrating a case in which the NFC unit operates as an initiator.

FIG. 19 is a flowchart illustrating a case in which the NFC unit operates as an initiator.

In step S1901, every NFC unit 1000 operates as a target and waits for an instruction from an initiator. In this state, the NFC unit 1000 can switch to an initiator in response to a request from an application for controlling communication complying with the NFC standard. For example, when the user of the personal communication terminal apparatus 200 activates the application for controlling communication complying with the NFC standard, the application requests the NFC unit 818 to switch to an initiator. Alternatively, when the user instructs an application to operate a function using communication complying with the NFC standard (for example, a printing function using communication complying with the NFC standard), the application issues a request as described above.

When the NFC unit responds to the request to switch to an initiator, in step S1903 the application of the NFC unit 1000 selects the active mode or passive mode to decide the transmission rate. In step S1904, the NFC unit 1000 serving as an initiator detects the existence of an external RF field output by an apparatus other than the self apparatus. That is, it is determined whether an external RF field exists. If an external RF field exists (YES in step S1904), the initiator waits until no RF field is detected without generating a self RF field. On the other hand, if no external RF field exists (NO in step S1904), the process advances to step S1905, and the NFC unit 1000 serving as an initiator generates a self RF field. Through the above steps, the NFC unit 1000 starts an operation as an initiator.

Figure 20:
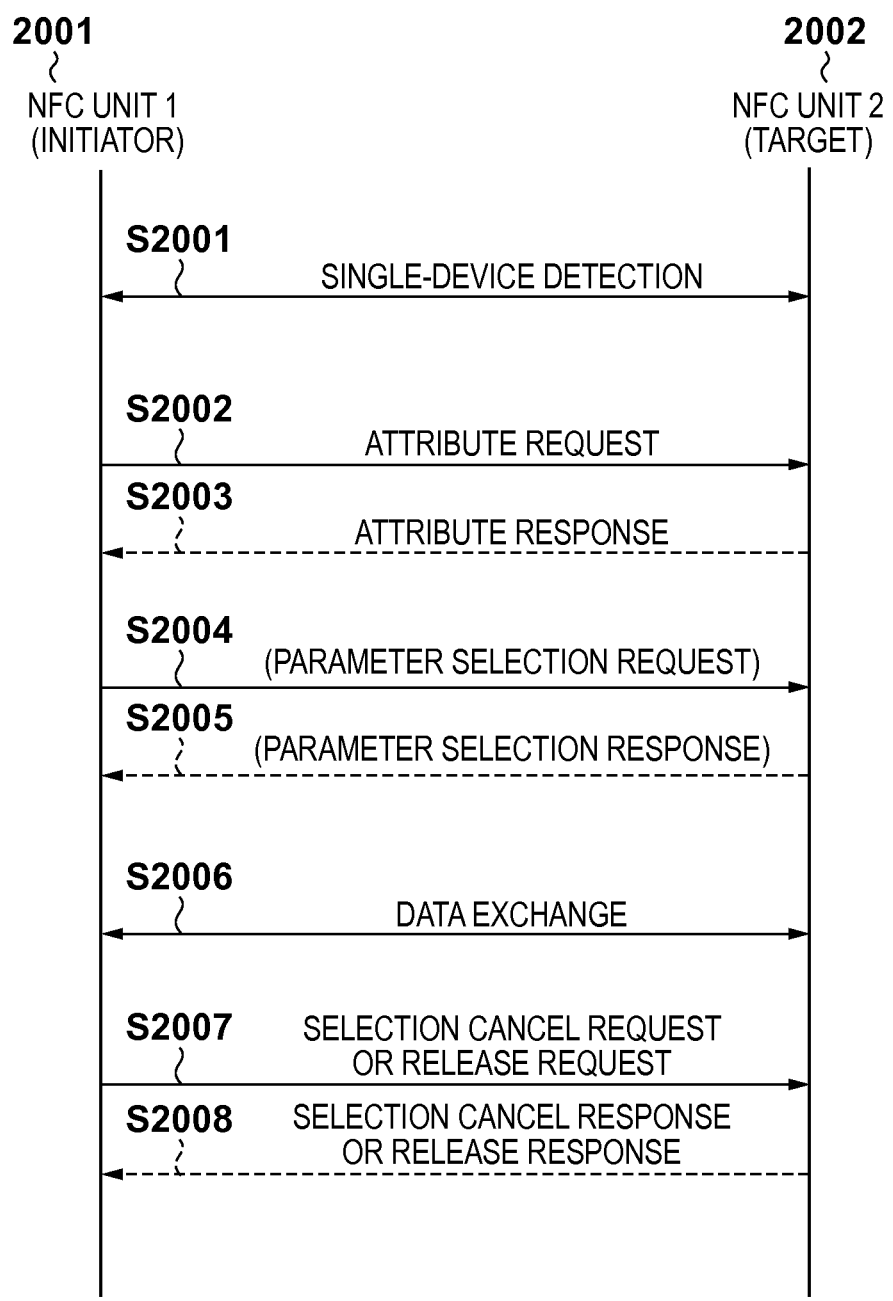
FIG. 20 is a sequence chart showing a sequence of performing data exchange in the passive mode.

FIG. 20 is a sequence chart showing a sequence of performing data exchange in the passive mode.

A case will now be described in which a first NFC unit 2001 operates as an initiator, and a second NFC unit 2002 operates as a target.

In step S2001, the first NFC unit 2001 performs single-device detection and specifies the second NFC unit 2002. In step S2002, the first NFC unit 2001 transmits the identifier of its own, the bit transmission rate of transmission/reception, the effective data length, and the like as an attribute request. The attribute request has general purpose bytes which can be arbitrarily selected and used.

Upon receiving an effective attribute request, the second NFC unit 2002 transmits an attribute response in step S2003. Transmission from the second NFC unit 2002 is done by load modulation. Data transmission by load modulation is represented by a dotted arrow in FIG. 20.

After confirming an effective attribute response, the first NFC unit 2001 can change the parameters of the subsequent transmission protocol by transmitting a parameter selection request in step S2004. Parameters included in the parameter selection request are the transmission rate and the effective data length.

Upon receiving an effective parameter selection request, the second NFC unit 2002 transmits a parameter selection response in step S2005, thereby changing the parameters. Note that steps S2004 and S2005 may be omitted if the parameter change is not to be performed.

In step S2006, the first NFC unit 2001 and the second NFC unit 2002 exchange data by a data exchange request and a data exchange response. At the time of transmitting the data exchange request and the data exchange response, information for an application of the communication partner or the like can be transmitted as data. If the data size is large, the data can be divisionally transmitted.

Upon completion of data exchange, the first NFC unit 2001 transmits one of a selection cancel request and a release request in step S2007.

When the first NFC unit 2001 transmits the selection cancel request, the second NFC unit 2002 transmits a selection cancel response in step S2008. Upon receiving the selection cancel response, the first NFC unit 2001 releases the attributes representing the second NFC unit 2002, and the process returns to step S2001.

On the other hand, when the first NFC unit 2001 transmits the release request, the second NFC unit 2002 transmits a release response in step S2008, thereby returning to the initial state. Upon receiving the release response, the first NFC unit 2001 may return to the initial state because the target is completely released.

Figure 21:
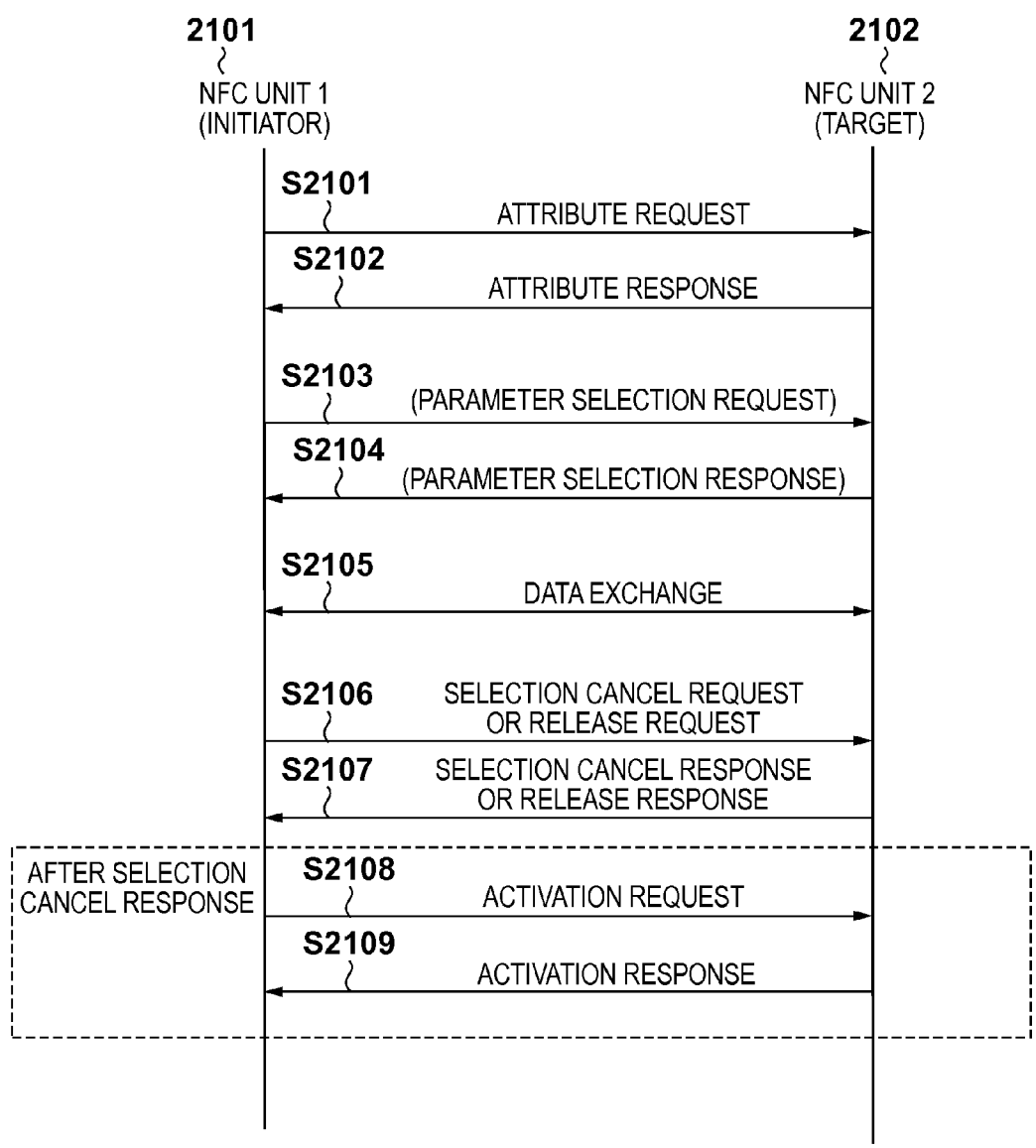
FIG. 21 is a sequence chart showing a sequence of performing data exchange in the active mode.

FIG. 21 is a sequence chart showing a sequence of performing data exchange in the active mode.

A case will now be described in which a first NFC unit 2101 operates as an initiator, and a second NFC unit 2102 operates as a target.

In step S2101, the first NFC unit 2101 transmits the identifier of its own, the bit transmission rate of transmission/reception, the effective data length, and the like as an attribute request.

Upon receiving an effective attribute request, the second NFC unit 2102 transmits an attribute response in step S2102. Transmission from the second NFC unit 2102 is done by an RF field generated by itself. For this reason, the first NFC unit 2101 and the second NFC unit 2102 stop outputting the RF fields upon completion of data transmission.

After confirming an effective attribute response, the first NFC unit 2101 can change the parameters of the transmission protocol by transmitting a parameter selection request in step S2103. Parameters included in the parameter selection request are the transmission rate and the effective data length.

Upon receiving an effective parameter selection request, the second NFC unit 2102 transmits a parameter selection response in step S2104, thereby changing the parameters. Note that steps S2103 and S2104 may be omitted if the parameter change is not to be performed, as in the passive mode.

In step S2105, the first NFC unit 2101 and the second NFC unit 2102 exchange data by a data exchange request and a data exchange response. At the time of transmitting the data exchange request and the data exchange response, information for an application or the like can be transmitted as data. If the data size is large, the data can be divisionally transmitted.

Upon completion of data exchange, the first NFC unit 2101 transmits one of a selection cancel request and a release request in step S2106.

When the first NFC unit 2101 transmits the selection cancel request, the second NFC unit 2102 transmits a selection cancel response in step S2107. Upon receiving the selection cancel response, the first NFC unit 2101 releases the attributes representing the second NFC unit 2102. After that, in step S2108, the first NFC unit 2101 transmits an activation request to another target whose identifier is known. Upon receiving the activation request, the target transmits an activation response in step S2109, and the process returns to step S2101.

On the other hand, when the first NFC unit 2101 transmits the release request, the second NFC unit 2102 transmits a release response in step S2108, thereby returning to the initial state. Upon receiving the release response, the first NFC unit 2101 may return to the initial state because the target is completely released.

Figure 22:
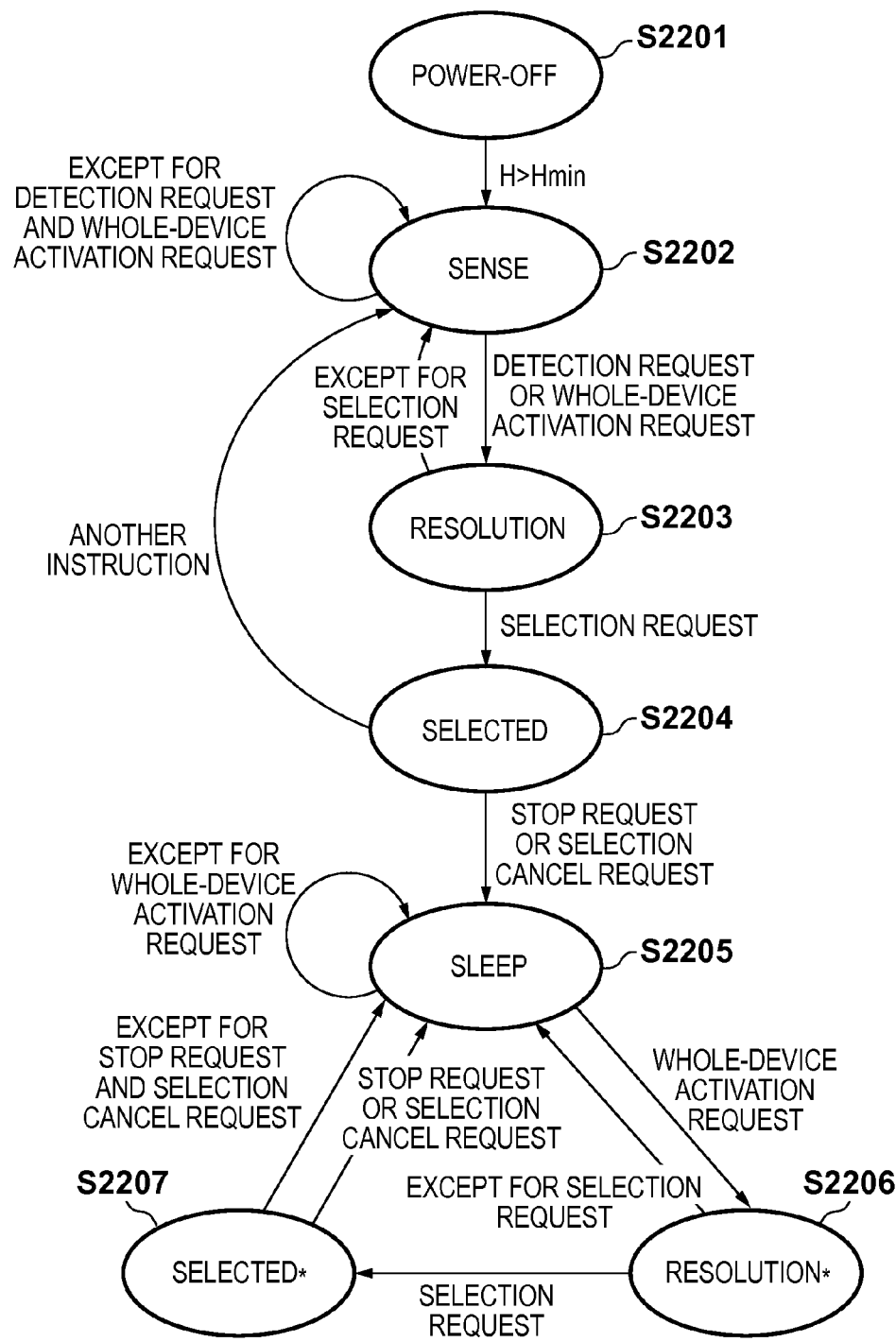
FIG. 22 is a view showing the state transition of a target in NFC.

FIG. 22 is a view showing the state transition of a target in NFC.

A POWER-OFF state S2201 represents a power-off state. In the POWER-OFF state S2201, when the target is placed in a magnetic field H larger than a threshold Hmin, it transits to a SENSE state S2202.

In the SENSE state S2202, the target waits for an instruction from an initiator. Upon receiving a detection request or whole-device activation request, the target transits to a RESOLUTION state S2203, and returns a detection response. Upon receiving another instruction, the target stays in the SENSE state S2202.

In the RESOLUTION state S2203, single-device detection is used. Upon receiving an effective selection request as a result of the single-device detection, the target returns a selection response to an initiator, and transits to a SELECTED state S2204. Upon receiving another instruction, the target returns to the SENSE state S2202.

In the SELECTED state S2204, the target recognizes an attribute request, a parameter selection request, or an instruction of an effective unique specification. Upon receiving an effective stop request or selection cancel request, the target transits to a SLEEP state S2205. Upon receiving another instruction, the target returns to the SENSE state S2202.

Upon receiving a whole-device activation request, the target in the SLEEP state S2205 returns a detection response, and then transits to a RESOLUTION* state S2206. Upon receiving another instruction, the target stays in the SLEEP state S2205.

The RESOLUTION* state S2206 is almost the same as the RESOLUTION state S2203, and single-device detection is used. Upon receiving an effective selection request, the target transits to a SELECTED* state S2207. Upon receiving another instruction, the target returns to the SLEEP state S2205.

The SELECTED* state S2207 is almost the same as the SELECTED state S2204, and the target recognizes an attribute request, a parameter selection request, or an instruction of an effective unique specification. Upon receiving an effective stop request or selection cancel request, the target transits to the SLEEP state. Upon receiving another instruction, the target falls back to the SLEEP state.

Figure 23:
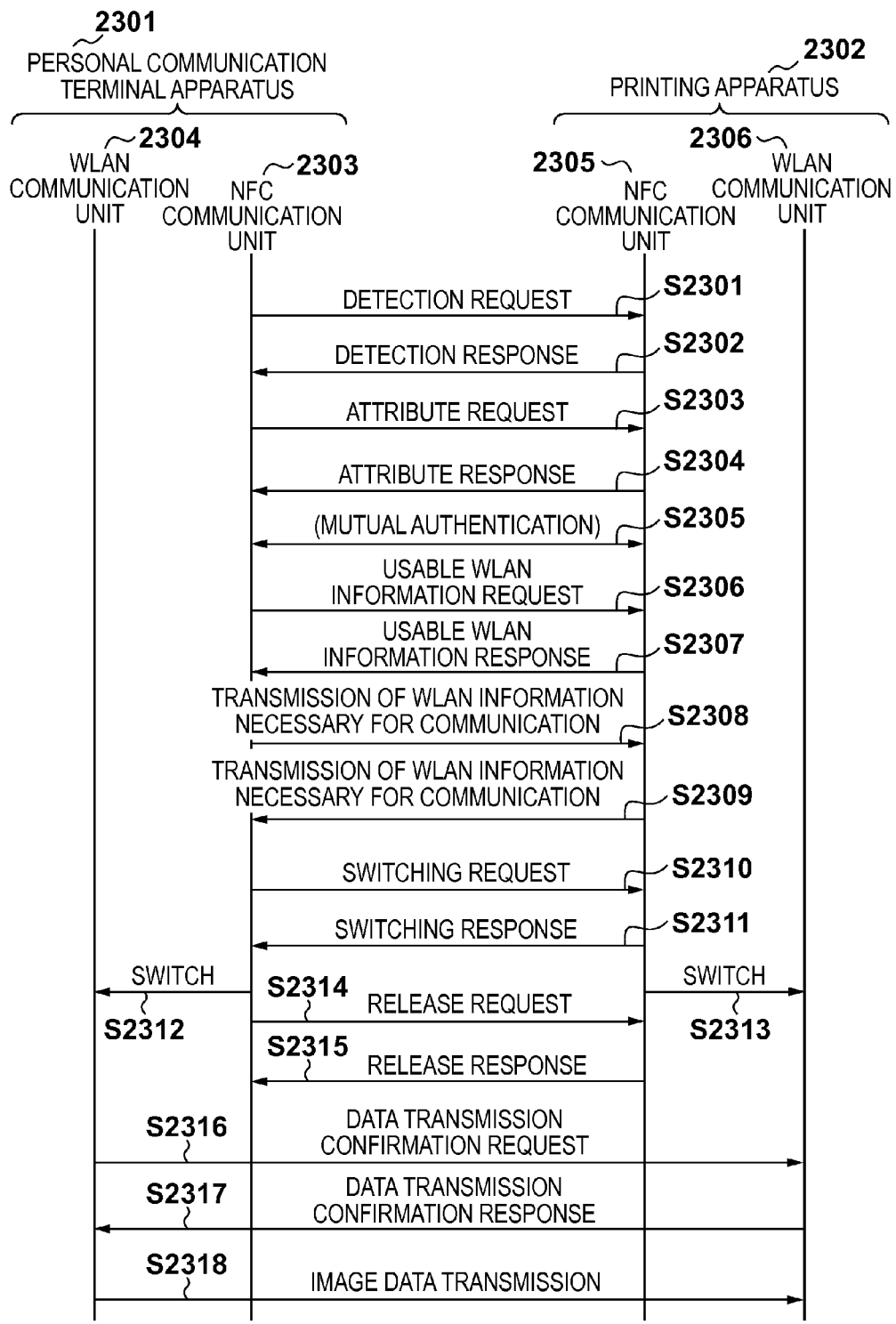
FIG. 23 is a sequence chart showing a sequence when data transfer is performed by switching between NFC and WLAN.

FIG. 23 shows a sequence when data transfer is performed by switching between NFC and WLAN.

Since the communication rate of NFC is relatively as low as several hundred bps, authentication or the like is executed by NFC, and a large amount of data is transferred using a faster WLAN, thus attaining efficient data transfer.

FIG. 23 shows an example of so-called PUSH type communication in which in order to print image data existing in a personal communication terminal apparatus 2301 using a printing apparatus 2302, the personal communication terminal apparatus 2301 serves as an initiator to transfer the print data.

In this example, the personal communication terminal apparatus 2301 corresponds to the personal communication terminal apparatus 200 of FIG. 1, and the printing apparatus 2302 corresponds to the MFP 300 of FIG. 1. An NFC communication unit 2303 and WLAN communication unit 2304 correspond to the NFC unit 818 and WLAN unit 817 of FIG. 8, respectively. Furthermore, an NFC communication unit 2305 and WLAN communication 2306 correspond to the NFC unit 918 and WLAN unit 917 of FIG. 9, respectively.

In step S2301, to establish NFC communication, the NFC communication unit 2303 serves as an initiator to detect the NFC communication unit 2305 as a target.

When the NFC communication unit 2305 is normally detected, it transmits a detection response in step S2302. Note that the example shown in FIG. 23 indicates a case in which the personal communication terminal apparatus 2301 serves as an initiator. However, in practice, the printing apparatus 2302 may serve as an initiator based on an input from the operation and display unit 305.

Upon normally receiving the detection response, in step S2303 the NFC communication unit 2303 transmits an attribute request for performing NFC communication.

Upon receiving the attribute request, the NFC communication unit 2305 transmits an attribute response in step S2304. Note that the NFC IDs of the initiator and target are transmitted at the time of transmitting the attribute request and the attribute response, respectively, thereby specifying a communication partner based on these IDs.

In step S2305, mutual authentication is executed between the NFC communication units 2303 and 2305, and an encryption key or the like for data encryption can be transferred. Note that if it is not necessary to transfer an encryption key, mutual authentication need not be performed.

In step S2306, the NFC communication unit 2303 requests, of the NFC communication unit 2305, information of a communication protocol usable by the printing apparatus 2302. This request includes information of a communication protocol usable by the personal communication terminal apparatus 2301. Therefore, upon receiving this request, the NFC communication unit 2305 can recognize that WLAN communication of the personal communication terminal apparatus 2301 is usable.

In step S2307, the NFC communication unit 2305 returns information of a communication protocol usable by itself as a response to the received request. This enables both the apparatuses to recognize the usable communication protocol of one another.

Assume that WLAN as a recognized protocol other than NFC can attain faster data transfer than NFC, and the personal communication terminal apparatus 2301 serving as an initiator decides to perform communication by switching (handing over) the protocol to WLAN. Note that the printing apparatus 2302 may decide to switch the protocol. In this case, in steps S2308 and S2309, for example, information such as an address which is used to specify a communication partner and required to perform WLAN communication is exchanged.

In step S2310, the NFC communication unit 2303 transmits a request to switch from NFC communication to WLAN communication.

Upon receiving the switching request, the NFC communication unit 2305 returns a switching response in step S2311.

When the NFC communication unit 2303 receives the switching response, it is switched to the WLAN communication unit 2304 in step S2312.

When the NFC communication unit 2305 transmits a switching response, it is switched to the WLAN communication unit 2306 in step S2313.

After the switching, the NFC communication unit 2303 transmits a release request in step S2314.

Upon receiving the release request, the NFC communication unit 2305 transmits a release response in step S2315, thereby terminating NFC communication.

In step S2316 and subsequent steps, WLAN communication is performed based on the pieces of information for WLAN communication which have been exchanged in steps S2308 and S2309.

In step S2316, the WLAN communication unit 2304 transmits a confirmation request to confirm, with the WLAN communication unit 2306, whether data transfer is possible. In this case, contents to be confirmed include, for example, a free space required to temporarily save an image to be transferred to the printing apparatus 2302.

Upon receiving the confirmation request, the WLAN communication unit 2306 transmits a confirmation response to the confirmation request in step S2317.

When the WLAN communication unit 2304 receives the confirmation response, and determines that data transfer is possible, it transmits image data existing in the personal communication terminal apparatus 2301 to the WLAN communication unit 2306 in step S2318. This allows a large amount of data to be transferred using a faster communication protocol.

Figure 24:
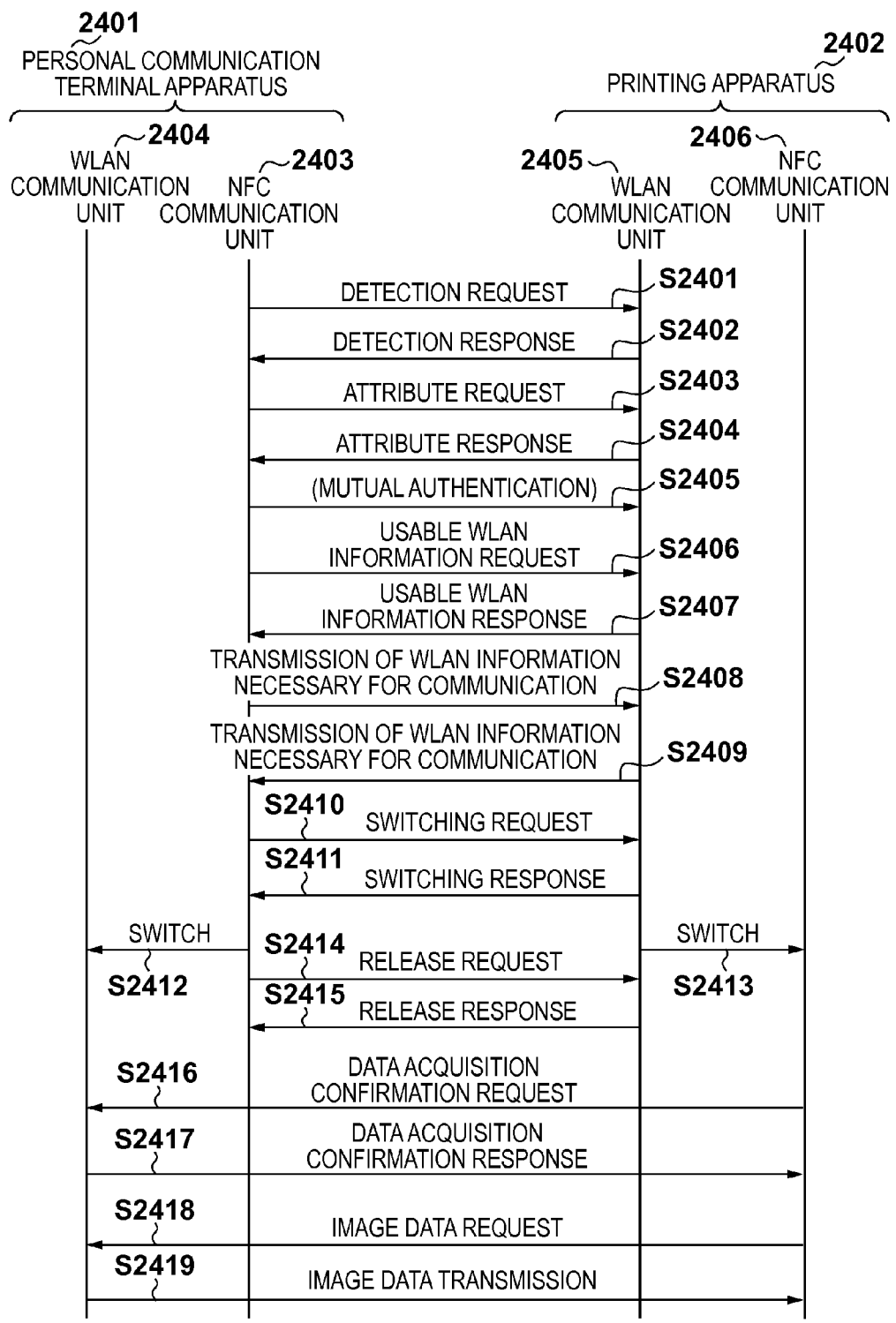
FIG. 24 is a sequence chart showing a sequence when data transfer is performed by switching between NFC and WLAN.

FIG. 24 shows a sequence when data transfer is performed by switching between NFC and WLAN.

FIG. 24 shows an example of so-called PULL type communication in which in order to print image data existing in a personal communication terminal apparatus 2401 using a printing apparatus 2402, the printing apparatus 2402 serves as an initiator to transfer the image data.

Note that the personal communication terminal apparatus 2401, a WLAN communication unit 2404, and an NFC communication unit 2403 correspond to the personal communication terminal apparatus 2301, WLAN communication unit 2304, and NFC communication unit 2303 of FIG. 23, respectively. The printing apparatus 2402, a WLAN communication unit 2406, and an NFC communication unit 2405 correspond to the printing apparatus 2302, WLAN communication unit 2306, and NFC communication unit 2305 of FIG. 23, respectively. In addition, steps S2401 to S2415 correspond to steps S2301 to S2315 of FIG. 23, respectively, and a detailed description thereof will be omitted.

After communication is switched from that based on the NFC standard to WLAN communication, the WLAN communication unit 2406 transmits a data acquisition confirmation request to the WLAN communication unit 2404 in step S2416. In this case, contents to be confirmed include, for example, a data size planned to be transferred by the personal communication terminal apparatus 2401.

Upon receiving the data acquisition confirmation request associated with transfer data, the WLAN communication unit 2404 transmits a confirmation response in step S2417.

When the WLAN communication unit 2406 receives the confirmation response, and determines that data transfer is possible in consideration of a free space of the printing apparatus 2402 and the like, it requests image data in step S2418.

Upon receiving the image data request, the WLAN communication unit 2404 transmits the requested image data in step S2419.

Figure 25:
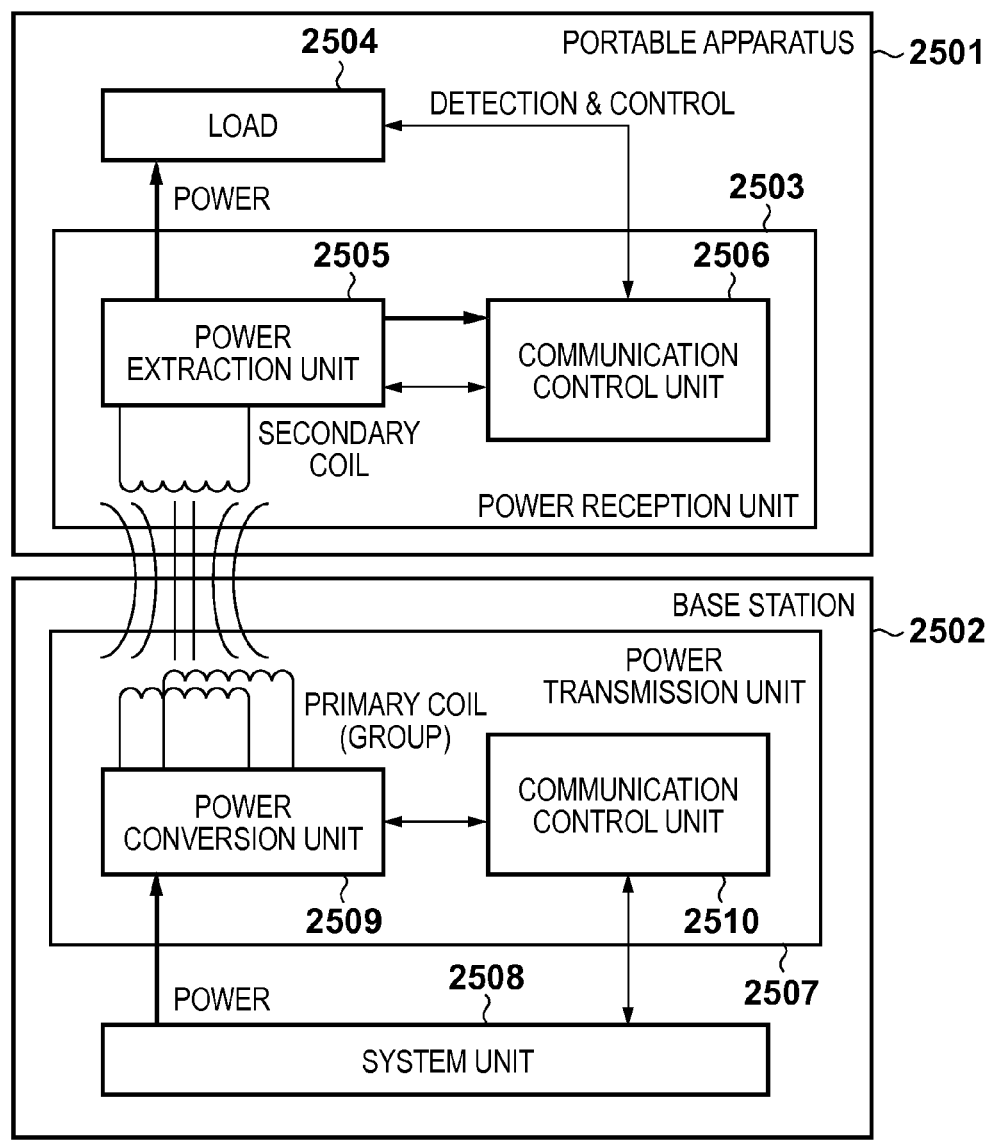
FIG. 25 is a schematic view showing a Qi system configuration.

FIG. 25 is a schematic view showing a Qi system configuration.

The system includes a portable apparatus 2501 for receiving power using an electromagnetic induction mechanism, and a base station 2502 for transmitting power. For example, the above-described personal communication terminal apparatus 200 operates as the portable apparatus 2501, and the above-described MFP 300 operates as the base station 2502.

The portable apparatus 2501 is formed from a power reception unit 2503 for receiving power according to Qi, and a load 2504. The power reception unit 2503 includes a power extraction unit 2505 for extracting power from a secondary coil connected to itself, and a communication control unit 2506 for performing various control operations.

The base station 2502 is formed from a power transmission unit 2507 for transmission power according to Qi, and a system unit 2508. The power transmission unit 2507 includes a power conversion unit 2509 for supplying power to a primary coil connected to itself, and a communication control unit 2510 for performing various control operations. The primary coil connected to the power transmission unit 2507 may move according to the position of the power reception unit 2503. Alternatively, a plurality of coils may be included and it may be controlled to supply power to only a coil near the position of the power reception unit 2503. These control operations are implemented by programs stored in the communication control unit 2510.

The schematic view shown in FIG. 25 is applied to FIGS. 8 and 9 in this embodiment. The portable apparatus 2501 corresponds to the personal communication terminal apparatus 200, the power reception unit 2503 corresponds to the Qi power reception unit 826, and the load 2504 is a general term for respective units requiring power and shown in FIG. 8. Furthermore, the base station 2502 corresponds to the MFP 300, the power transmission unit 2507 corresponds to the Qi power transmission unit 926, and the system unit 2508 is a general term for other units shown in FIG. 9.

Figure 26:
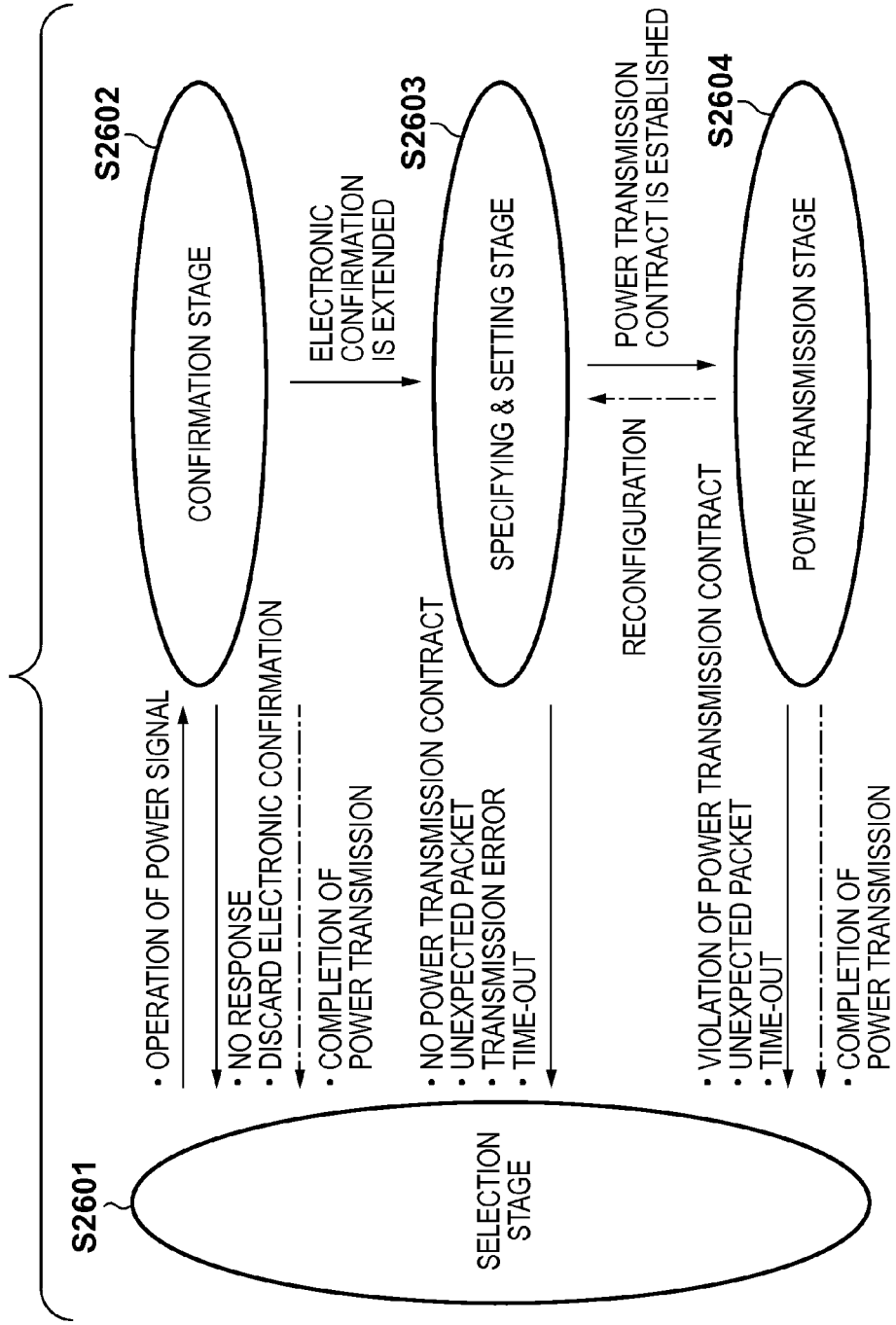
FIG. 26 is a schematic view showing the 4-stage state transition of Qi.

FIG. 26 is a schematic view showing the 4-stage state transition of Qi.

Power supply from the power transmission unit 2507 to the power reception unit 2503 is formed by four states, that is, a selection stage S2601, confirmation stage S2602, specifying & setting stage S2603, and power transmission stage S2604. A solid arrow indicates transition of the power transmission unit 2507, and a one-dot dashed arrow indicates transition of the power reception unit 2503. When the power reception unit 2503 is not compatible with a power signal or the power transmission unit 2507 stops issuing power signals, the state transits from any of other stages to the selection stage S2601. The main behavior in each stage will be explained below.

In the selection stage S2601, the power transmission unit 2507 monitors whether the power reception unit 2503 enters or leaves a communication range. Upon detecting the power reception unit 2503, the power transmission unit 2507 attempts to specify the location of the power reception unit 2503, as needed, thereby deciding a transmission power target. There are many methods of using the selection stage S2601, and it is possible to return to the selection stage S2601 to detect a new power reception unit 2503 even during charging. In this stage, the power transmission unit 2507 does not have enough information of the power reception unit 2503, and transits to the confirmation stage S2602 by operating a power signal.

In the confirmation stage S2602, the power transmission unit 2507 executes electronic confirmation, and detects a response to it. The electronic confirmation indicates an operation of an electronic signal for specifying the power reception unit 2503. Upon discovering the power reception unit 2503, the power transmission unit 2507 extends the electronic confirmation to transit to the specifying & setting stage S2603. If the power transmission unit 2507 does not extend the electronic confirmation, it returns to the selection stage S2601.

In the specifying & setting stage S2603, the power transmission unit 2507 specifies the selected power reception unit 2503, and acquires arrangement information (largest required power and the like) of the power reception unit 2503. The power transmission unit 2507 generates a power transmission contract using the arrangement information of the power reception unit 2503. The power transmission contract includes limitations of parameters characterizing the power transmission stage S2604. When the power transmission contract is established, the power transmission unit 2507 transits to the power transmission stage S2604. Before that, however, the power transmission unit 2507 can transit to the selection stage S2601 by stopping extending the electronic confirmation.

In the power transmission stage S2604, the power transmission unit 2507 adjusts the current of the primary coil based on control information acquired from the power reception unit 2503, and continues transmitting power to the power reception unit 2503. The power transmission unit 2507 monitors whether the limitations of the power transmission contract is violated. If the contract is violated, the power transmission unit 2507 stops transmitting power, and transits to the selection stage S2601. It is also possible to stop transmitting power in response to a request from the power reception unit 2503 for which charging is complete, or generate a power transmission contract again by transiting to the specifying & setting stage S2603 to shift to a trickle charge.

A case will be described in which while transmitting power to a general personal communication terminal apparatus 200a, the MFP 300 preferentially supplies power to a personal communication terminal apparatus 200b which uses the function of the MFP 300 (executes printing using the MFP 300). Note that the personal communication terminal apparatuses 200a and 200b correspond to the personal communication terminal apparatus 200 of FIG. 1.

Figure 27A:
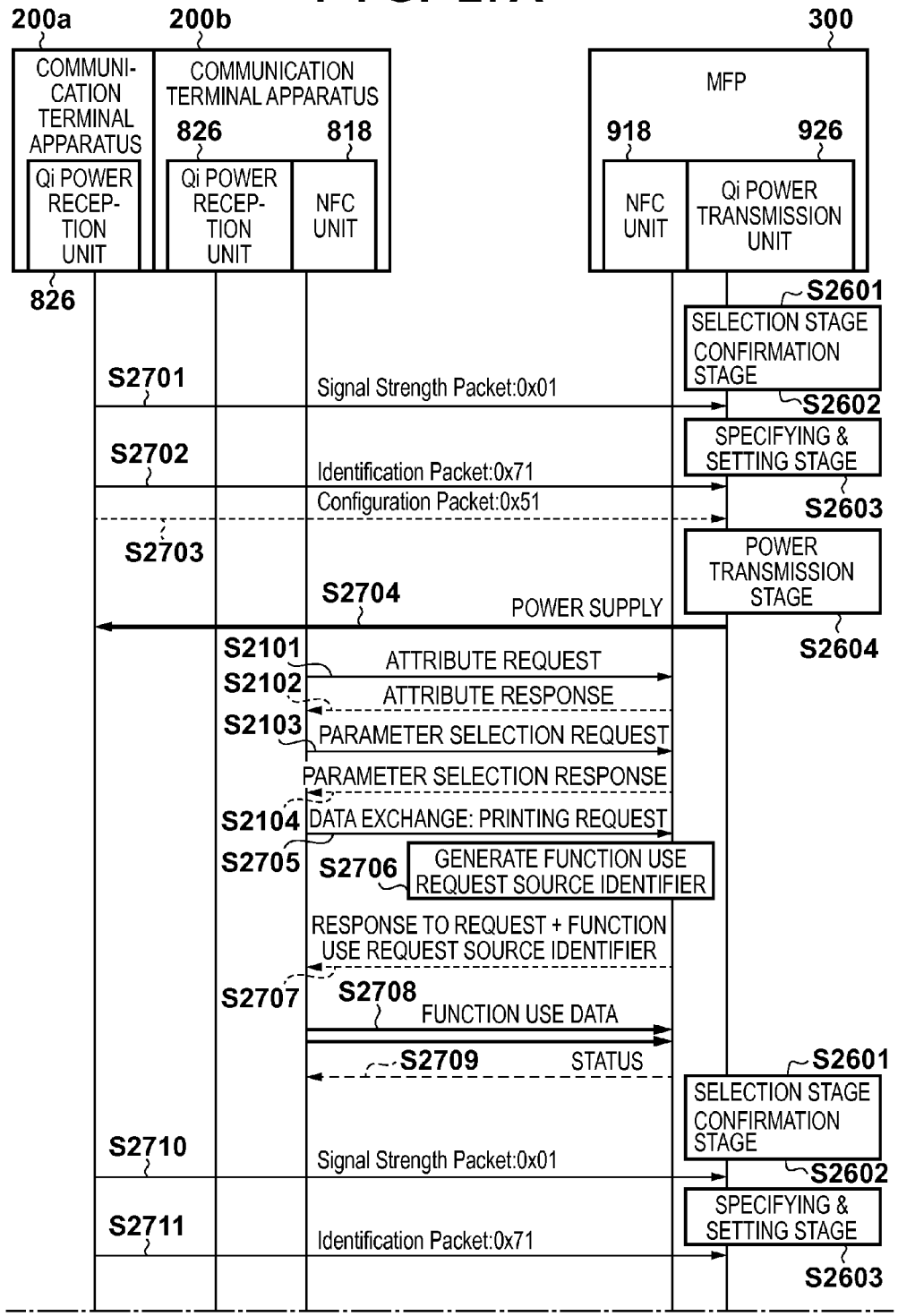
FIG. 27A is a sequence chart showing a sequence of commands between the MFP and the personal communication terminal apparatus.
Figure 27B:
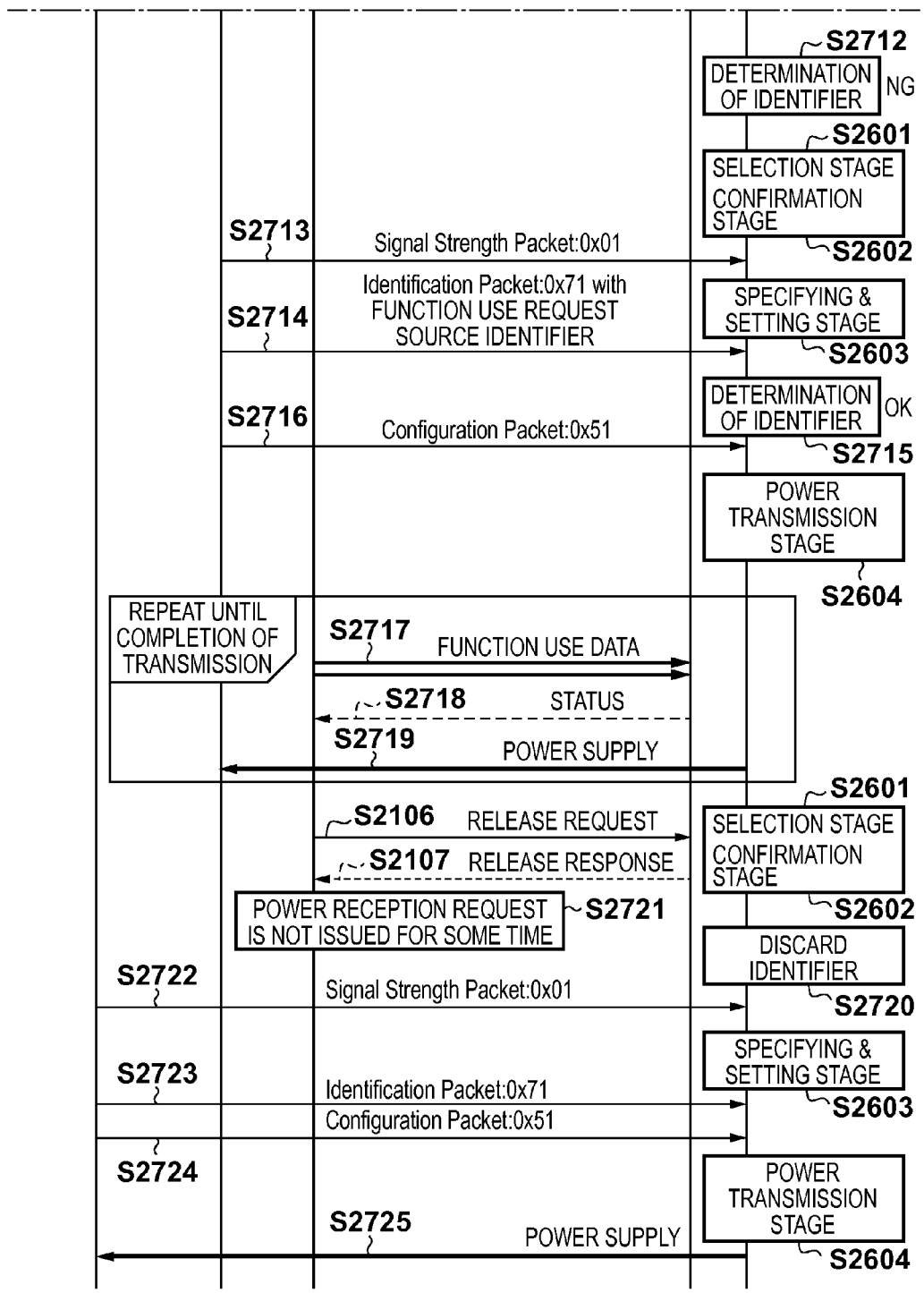
FIG. 27B is a sequence chart showing a sequence of commands between the MFP and the personal communication terminal apparatus.

FIGS. 27A and 27B are a sequence chart showing transmission and reception of commands between the MFP 300 and the personal communication terminal apparatus 200. The same processes as those shown in FIGS. 20, 21, and 26 have the same reference symbols and the following description will be made. Note that the processing shown in FIGS. 27A and 27B is implemented when the CPU 902 of the MFP 300 controls the NFC unit 918 and Qi power transmission unit 926 of the MFP 300, and the CPU 802 of the personal communication terminal apparatus 200 controls the NFC unit 818 and Qi power reception unit 826. More specifically, programs for implementing processes by the MFP 300 and personal communication terminal apparatus 200, which are shown in FIGS. 27A and 27B, are stored in the ROM 903 of the MFP 300 and the ROM 803 of the personal communication terminal apparatus 200. The processing shown in FIGS. 27A and 27B is implemented when the CPU 902 of the MFP 300 and the CPU 802 of the personal communication terminal apparatus 200 execute the programs in the RAMs 904 and 804, respectively.

The personal communication terminal apparatus 200a incorporates a Qi power reception unit, the personal communication terminal apparatus 200b incorporates a Qi power reception unit and NFC initiator, and the MFP 300 incorporates a Qi power transmission unit and NFC target. In the following description, processing associated with wireless charging is performed between the Qi power reception unit (Qi power reception unit 826) and the Qi power transmission unit (Qi power transmission unit 926).

A system in which the personal communication terminal apparatus 200a receives power from the MFP 300 will be described first.

In step S2701, the MFP 300 in the selection stage S2601 transits to the confirmation stage S2602 in response to an operation of an electronic signal from the personal communication terminal apparatus 200a installed nearby. The personal communication terminal apparatus 200a desires to receive power, and thus notifies the MFP 300 of a Signal Strength packet. The Signal Strength packet functions as a power request to request power supply (power reception). Upon receiving the Signal Strength packet, the MFP 300 transits to the specifying & setting stage S2603.

In step S2702, the personal communication terminal apparatus 200a notifies the MFP 300 of an Identification packet according to the wireless charging standard Qi. By using the Identification packet, the personal communication terminal apparatus 200a can notify the MFP 300 of Basic Device Identifier formed by a character string of 20 bits to 31 bits. Basic Device Identifier functions as the identifier (power request source identifier) of the device which requests power supply (power reception).

In step S2703, the personal communication terminal apparatus 200a notifies the MFP 300 of a Configuration packet. In the Configuration packet, the personal communication terminal apparatus 200a designates Power Class and the like which are defined by Qi, and defines an amount of power to be received.

Upon receiving the Identification packet and the Configuration packet, the MFP 300 transits to the power transmission stage S2604. In step S2704, the MFP 300 transmits (supplies) power to the personal communication terminal apparatus 200a in accordance with the pieces of information defined in the received packets.

A case will be described in which the personal communication terminal apparatus 200b preferentially receives power by executing printing for the MFP 300 under the above-described situation.

Steps S2101 to S2104 are the same as those of FIG. 21. As a result, the NFC unit 818 of the personal communication terminal apparatus 200b serves as an initiator, and thus data exchange with the MFP 300 becomes possible.

In step S2705, the NFC unit 818 of the personal communication terminal apparatus 200b transmits a printing request to the MFP 300.

When the NFC unit 918 receives the printing request, in step S2706 the MFP 300 generates a function use request source identifier for identifying the personal communication terminal apparatus 200b as a printing request source (function request source). The function use request source identifier is formed by a 20-bit character string complying with Basic Device Identifier included in the Identification packet. The MFP 300 on the reception side needs to ensure that the identifier has a unique value. Note that the above-described function use request source identifier is an identifier generated by the CPU 902 on the RAM 904.

In step S2707, the MFP 300 uses the NFC unit 918 to notify the personal communication terminal apparatus 200b of the function use request source identifier together with a response indicating printing permission. The function use request source identifier also indicates that power supply is possible. When the personal communication terminal apparatus 200 is notified of the function use request source identifier, it uses the function use request source identifier as a power request source identifier to request power reception. A detailed description thereof will be provided later.

Upon receiving the response indicating printing permission, the personal communication terminal apparatus 200b starts to transfer print data as function use data to the MFP 300 in step S2708.

In step S2709, the MFP 300 periodically notifies the personal communication terminal apparatus 200b of the status of the print data. The contents of the status include a remaining ink amount, a currently processed page count, or information of an error which has occurred. At the same time, the MFP 300 detects that a function other than a power transmission function has been used, and interrupts the power transmission function by transiting from the power transmission stage S2604 to the selection stage S2601. After that, the MFP 300 operates Power Signal to transit to the confirmation stage S2602.

Upon detecting that power reception has been interrupted, the personal communication terminal apparatus 200a notifies the MFP 300 of a Signal Strength packet in step S2710, as in step S2701. Upon receiving the Signal Strength packet, the MFP 300 transits to the specifying & setting stage S2603.

As in step S2702, the personal communication terminal apparatus 200a notifies the MFP 300 of an Identification packet in step S2711.

Upon receiving the Identification packet, the MFP 300 confirms in step S2712 whether Basic Device Identifier indicated in the packet coincides with the function use request source identifier generated in step S2706. More specifically, the MFP 300 compares the function use request source identifier generated on the RAM 904 in response to the printing request received by the NFC unit 918 from the personal communication terminal apparatus 200 with the power request source identifier received by the communication control unit of the Qi power transmission unit 926. If the identifiers coincide with each other, it can be determined that the apparatus which has requested power reception is an apparatus which is performing communication by NFC.

In this embodiment, when the Qi power transmission unit 926 of the MFP 300 receives an NFC communication request, it transmits power to an apparatus which has requested power reception under the condition that the apparatus is an apparatus which performs NFC communication. A detailed description thereof will be provided later.

In step S2712, the personal communication terminal apparatus 200a has not received the function use request source identifier of the personal communication terminal apparatus 200b, which has been generated in steep S2706. Consequently, the power request source identifier transmitted by the personal communication terminal apparatus 200a is different from the function use request source identifier of the personal communication terminal apparatus 200b, which has been generated in step S2706. Therefore, the identifiers do not coincide with each other in step S2712. That is, it is determined that the apparatus which has requested power reception is different from the apparatus which performs NFC communication. To reset a series of processes toward the power transmission stage S2604, the MFP 300 transits from the power transmission stage S2604 to the selection stage S2601, and continuously transits to the confirmation stage S2602 by operating Power Signal. As a result, even if a Configuration packet is received from the personal communication terminal apparatus 200a after that, the MFP 300 does not transit to the power transmission stage S2604, and the personal communication terminal apparatus 200a cannot receive power from the MFP 300, thereby repeating steps S2710 and S2711.

As in step S2701, the personal communication terminal apparatus 200b notifies the MFP 300 of a Signal Strength packet in step S2713. Upon receiving the Signal Strength packet, the MFP 300 transits to the specifying & setting stage S2603.

As in step S2702, the personal communication terminal apparatus 200b notifies the MFP 300 of an Identification packet as a power request source identifier in step S2714. At this time, the function use request source identifier sent in step S2707 is described as Basic Device Identifier.

As in step S2712, the MFP 300 confirms in step S2715 whether Basic Device Identifier serving as a power request coincides with the function use request source identifier generated in step S2706. In this case, the function use request source identifier received by the personal communication terminal apparatus 200b in step S2707 is used as a power request source identifier, as described above. Therefore, the identifiers coincide with each other in step S2715. That is, it is determined that the apparatus which has requested power reception is the same as the apparatus which performs NFC communication. It is thus determined that the apparatus which has requested power reception in steps S2713 and S2714 requires power for NFC communication. Therefore, the MFP 300 continues the series of processes toward the power transmission stage S2604 in order to transmit power to the apparatus which has requested power reception in steps S2710 and S2711.

As in step S2703, the personal communication terminal apparatus 200b notifies the MFP 300 of a Configuration packet in step S2716. Upon receiving the Identification packet and Configuration packet, the MFP 300 transits to the power transmission stage S2604.

In step S2717, the personal communication terminal apparatus 200b continues the processing in step S2708. In FIG. 27B, this processing is performed after step S2716. However, the processing in step S2708 actually continues, since communication is performed between the NFC units 818 and 918.

In step S2718, the MFP 300 continues the status response processing in step S2709.

As a result of transiting to the power transmission stage S2604 via step S2716, the MFP 300 transmits power to the personal communication terminal apparatus 200b in step S2719. Steps S2717 to S2719 are repeatedly performed until printing is completed. Upon completion of printing, the process advances to step S2106.

Steps S2106 and S2107 in which function use is terminated are the same as those of FIG. 21, and the personal communication terminal apparatus 200b and the MFP 300 return to the initial state. The MFP 300 detects that function use has been terminated, and transits from the power transmission stage S2604 to the selection stage S2601, thereby interrupting the power transmission function. After that, the MFP 300 operates Power Signal to transit to the confirmation stage S2602.

Upon detecting that function use has been terminated, in step S2720 the MFP 300 discards the function use request source identifier generated in step S2706. This is done to prevent the function use request source identifier from being unnecessarily reused.

In step S2721, the personal communication terminal apparatus 200b which has preferentially received power refrains from issuing a power reception request without notifying the MFP 300 of a Signal Strength packet (prohibits a power request from being transmitted) until a predetermined time elapses. This is done to resume power reception when the personal communication terminal apparatus 200a which previously received power from the MFP 300 desires to continuously receive power. Note that the predetermined time may be a fixed time in the personal communication terminal apparatus 200b, or a time designated by the MFP 300 for the personal communication terminal apparatus 200b in step S2707 or S2709.

Steps S2722 to S2725 are the same as steps S2701 to S2704, respectively. The personal communication terminal apparatus 200a can receive power again from the MFP 300.

As described above, according to this embodiment, it is possible to determine whether an apparatus which has requested power reception is the same as that which is performing NFC communication, by comparing an apparatus identifier received by the MFP 300 via NFC communication with the identifier of the apparatus which has requested power reception complying with Qi. If these apparatuses are determined as the same apparatus, the MFP 300 transmits power to the apparatus; otherwise, the MFP 300 does not transmit power to the apparatus which has requested power reception.

It is, therefore, possible to preferentially transmit power to the apparatus which performs NFC communication. In the above example, for example, the personal communication terminal apparatus 200b which requests the use of the printing function of the MFP 300 can receive power from the MFP 300 during print processing of its own even while the MFP 300 is charging another apparatus. This enables the personal communication terminal apparatus 200b to avoid a risk that the battery runs out during the print processing.

The personal communication terminal apparatus 200a can receive power from the MFP 300 before and after the personal communication terminal apparatus 200b performs NFC communication with the MFP 300. It is, therefore, possible to preferentially transmit power to an apparatus which performs NFC communication while appropriately transmitting power to an apparatus which does not perform NFC communication. For example, the processing in step S2721 enables the personal communication terminal apparatus 200a to resume power reception from the MFP 300 without any special mechanism after completion of printing of the personal communication terminal apparatus 200b.

Note that the MFP 300 interrupts power transmission at the time of step S2709 in this embodiment. However, the timing of interrupting power transmission is not limited to this. For example, the MFP 300 may interrupt power transmission at the time of step S2706 or S2707. In this embodiment, until the personal communication terminal apparatus 200b starts printing, the personal communication terminal apparatus 200a can receive power. In this case, however, power reception by the personal communication terminal apparatus 200a is interrupted earlier. Therefore, care must be taken for that.

The case in which a function use request source identifier is generated and transmitted in steps S2706 and S2707 has been described above with reference to FIG. 27A. However, the present invention is not limited to this. For example, the personal communication terminal apparatus 200b may transmit an identifier unique to the apparatus to the MFP 300 in step S2705, and transmit the same identifier to the MFP 300 when requesting power reception in steps S2713 and S2714. The MFP 300 can then determine whether the apparatus which has requested printing by NFC is the same as that which has requested power reception.

Furthermore, various improvements can be made without departing from the spirit and scope of the present invention, as a matter of course. For example, the apparatus may be notified of the period of validity of the function use request source identifier in step S2707 by further providing a mechanism of managing the period of validity of the function use request source identifier.

Other Embodiments

In the above embodiment, the MFP 300 temporarily prohibits power transmission to the personal communication terminal apparatus 200*a* using the function use request source identifier. The present invention, however, is not limited to this. Although the efficiency decreases as compared with the personal communication terminal apparatus 200*b*, the personal communication terminal apparatus 200*a* can continue receiving power. For example, if the base station 2502 of the MFP 300 has a movable coil mechanism, the personal communication terminal apparatus 200*a* may receive power from leakage flux when controlling the primary coils to a position appropriate for the personal communication terminal apparatus 200*b*. Alternatively, if the base station 2502 of the MFP 300 has a mechanism in which a plurality of coils are arranged, the personal communication terminal apparatus 200*a* may receive power from leakage flux when power is supplied to a coil at a position appropriate for the personal communication terminal apparatus 200*b*.

Processing associated with the use of a function is not necessarily executed between an NFC initiator (NFC unit 818) and an NFC target (NFC unit 918). For example, the processing may be handed over to wireless LAN communication (using the WLAN units 817 and 917) or the like in the middle of the processing.

Note that the arrangement using the printing function among the various functions of the MFP 300 has been explained. The present invention, however, is not limited to this. For example, it is also possible to use the scanning function of the MFP 300. More specifically, this can be implemented by controlling to transmit scan data from the MFP 300 to the personal communication terminal apparatus 200*b* in step S2708.

Furthermore, the personal communication terminal apparatus 200 is not limited to the smartphone, and the device which provides a function and power is not limited to the MFP 300. A mechanism in which the base station 2502 controls to switch the power transmission target portable apparatus 2501 using information indicating whether the function of the base station 2502 is used via another communication protocol is widely applicable. For example, a digital camera may receive power while acquiring an image from a Blu-ray drive.

Moreover, in the above embodiment, the arrangement in which each of the personal communication terminal apparatus and MFP includes the power transmission unit (or power reception unit) and the communication unit for performing wireless communication has been explained. The present invention, however, is not limited to this. The processing of the above embodiment may be executed when an external power transmission unit (or external power reception unit) and an external communication unit are attached to each of a personal communication terminal apparatus and MFP.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-137482, filed Jun. 28, 2013, which is hereby incorporated by reference herein in its entirety.

What is claimed is:

1. A communication apparatus for controlling a communication unit configured to communicate with one of plural external devices and a power transmission unit configured to transmit power to another or the same one of the external devices, comprising:

a reception unit configured to receive a use request to use a function of said communication apparatus from a first device included in the external devices via the communication unit;

an identification unit configured to identify a second device included in the external devices that requests power supply by the power transmission unit;

a determination unit configured to determine whether to cause the power transmission unit to transmit power to the second device based on whether the use request is received by the reception unit and whether the second device is the first device that transmits the use request; and a power transmission control unit configured to transmit, via the power transmission unit, power to the second device that requests power supply when said determination unit determines to transmit power, wherein the determination unit is configured to determine to cause the power transmission unit to transmit power to the second device in a case where the use request is not received by the reception unit or where the second device is the first device.

2. The apparatus according to claim 1, further comprising an interrupt unit configured to interrupt transmission of power to a third device if said third device is included in the external devices and is receiving power transmitted by the power transmission unit when the reception unit receives the use request.

3. The apparatus according to claim 2, wherein the power transmission control unit resumes transmission of power to the third device that has been interrupted by said interrupt unit when the use of the function by the first external device ends.

4. The apparatus according to claim 1, further comprising a transmission unit configured to transmit a first identifier for identifying the first device to the first device, wherein
said determination unit determines whether to transmit power to the second device based on whether a second identifier for identifying the second device corresponds to the first identifier transmitted by said transmission unit.

5. The apparatus according to claim 4, wherein the first identifier transmitted by said transmission unit is used as the second identifier.

6. The apparatus according to claim 4, wherein said transmission unit also notifies the first device of a period of validity of the first identifier in addition to the first identifier.

7. The apparatus according to claim 4, wherein the first identifier is newly generated when said reception unit receives the use request.

8. The apparatus according to claim 1, wherein said communication apparatus further includes at least one of a printing function and a scanning function,
the communication unit and the transmission unit use wireless communication, and
the communication unit uses NFC and the transmission unit uses Qi.

9. The apparatus according to claim 1, further comprising:
a first acquisition unit configured to acquire a first identifier for identifying the first device as a request source that requests the use of the function, when the reception unit receives the use request; and
a second acquisition unit configured to acquire a second identifier for identifying the second device that requests power supply by the power transmission unit, wherein based on whether or not the first identifier is acquired and whether the first identifier and the second identifier both identify the same device, the determination unit determines whether to cause the power transmission unit to transmit power to the second device.

10. The apparatus according to claim 1, wherein the communication apparatus is a printer, and the reception unit receive print data as the user request.

11. A control method for controlling a communication apparatus for controlling a communication unit configured to communicate with one of the external devices, and a power transmission unit configured to transmit power to another or the same one of the external devices, the method comprising:
receiving a use request to use a function of the communication apparatus from a first device included in the external devices via the communication unit;
identifying a second device included in the external devices which requests power supply by the power transmission unit;
based on whether the use request is received and whether the second device is the first device that transmits the use request, determining whether to cause the power transmission unit to transmit power to the second device; and
when it is determined to transmit power, transmitting power to the second device that requests power supply via the power transmission unit, wherein
it is determined to cause the power transmission unit to transmit power to the second device in a case where the use request is not received or where the second device is the first device.

* * * * *